United States Patent
Lee et al.

(10) Patent No.: US 9,680,987 B2
(45) Date of Patent: *Jun. 13, 2017

(54) MOBILE TERMINAL AND CONTROLLING METHOD THEREOF

(71) Applicant: LG ELECTRONICS INC., Seoul (KR)

(72) Inventors: Joowoo Lee, Seoul (KR); Jumin Chi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,562

(22) Filed: Sep. 7, 2016

(65) Prior Publication Data

US 2017/0006152 A1    Jan. 5, 2017

Related U.S. Application Data

(63) Continuation of application No. 14/302,654, filed on Jun. 12, 2014, now Pat. No. 9,467,558.

(30) Foreign Application Priority Data

Jun. 14, 2013  (KR) .................. 10-2013-0068309
Jun. 20, 2013  (KR) .................. 10-2013-0070959

(51) Int. Cl.
*H04B 1/38*     (2015.01)
*H04M 1/00*    (2006.01)
(Continued)

(52) U.S. Cl.
CPC ..... *H04M 1/72583* (2013.01); *H04M 1/0266* (2013.01); *H04M 19/04* (2013.01)

(58) Field of Classification Search
CPC . H04M 1/72583; H04M 19/04; H04M 1/0266
(Continued)

(56) References Cited

U.S. PATENT DOCUMENTS 7,142,195 B2    11/2006 Northway
7,903,093 B2     3/2011 Kim
(Continued)

OTHER PUBLICATIONS

U.S. Office Action for parent U.S. Appl. No. 14/302,654 dated Sep. 24, 2015.
(Continued)

*Primary Examiner* — Marceau Milford
(74) *Attorney, Agent, or Firm* — KED & Associates LLP

(57) ABSTRACT

A mobile terminal and controlling method thereof are disclosed. The present invention includes a wireless communication unit configured to perform a wireless communication, a touchscreen having a front output unit exposed from a front side of the touchscreen and at least one lateral output unit exposed from a lateral side of the touchscreen, and a controller, if an event occurs, controlling an object to be displayed on the lateral output unit to notify that the event occurs, the controller controls a detailed information on the event to be displayed through at least one of the front output unit and the lateral output unit in response to a input to the lateral output unit. Accordingly, the present invention outputs an alarm indicating an occurrence of an event and facilitates a content or substance of the occurring event to be checked.

10 Claims, 45 Drawing Sheets

(51) Int. Cl.
*H04M 1/725* (2006.01)
*H04M 19/04* (2006.01)
*H04M 1/02* (2006.01)

(58) Field of Classification Search
USPC ...... 455/566, 550.1, 575.8, 90.3, 466, 575.1
See application file for complete search history.

(56) References Cited

U.S. PATENT DOCUMENTS

| | | | | |
|---|---|---|---|---|
| 8,081,351 B2* | 12/2011 | Silverbrook | ............... | B41J 3/44 235/494 |
| 8,219,152 B2 | 7/2012 | Oh | | |
| 8,220,708 B2 | 7/2012 | Silverbrook | | |
| 8,385,986 B2* | 2/2013 | Kim | ................. | H04M 1/72522 320/101 |
| 8,429,564 B2 | 4/2013 | Alexanderovitc | | |
| 8,463,253 B2 | 6/2013 | Chipalkatti | | |
| 8,521,146 B2* | 8/2013 | Lee | ...................... | G06F 3/0482 455/412.1 |
| 8,565,830 B2 | 10/2013 | Cho | | |
| 8,568,830 B2* | 10/2013 | Finne | ................... | B29C 47/021 118/400 |
| 8,583,086 B2 | 11/2013 | Lim | | |
| 8,588,740 B2* | 11/2013 | Kim | ...................... | G06F 21/84 345/4 |
| 8,686,954 B2* | 4/2014 | Echeverri | ........... | G06F 3/04883 345/173 |
| 8,692,853 B2* | 4/2014 | Kim | ................... | G06F 3/04815 345/629 |
| 8,787,968 B2* | 7/2014 | Lee | ...................... | G06F 1/1643 455/407 |
| 8,831,567 B2* | 9/2014 | Kim | .................... | G06F 21/6218 455/411 |
| 8,874,032 B2* | 10/2014 | Yang | ........................ | H04B 5/00 455/41.1 |
| 8,890,805 B2* | 11/2014 | Kwon | ............... | H04M 1/72583 345/156 |
| 8,914,462 B2* | 12/2014 | Chang | ................... | G06F 3/1454 370/338 |
| 8,922,506 B2 | 12/2014 | Jung | | |
| 8,958,851 B2* | 2/2015 | Kim | ........................ | G06F 3/048 455/550.1 |
| 8,977,318 B2* | 3/2015 | Yu | ........................... | H04M 1/00 455/566 |
| 9,367,206 B2* | 6/2016 | Koo | ................... | G06F 3/04883 |
| 2006/0009155 A1* | 1/2006 | Paalasmaa | ............ | G06Q 10/10 455/41.2 |
| 2008/0220822 A1* | 9/2008 | Park | ...................... | G06F 3/0488 455/566 |
| 2009/0172543 A1* | 7/2009 | Cronin | ................ | G06F 3/04847 715/721 |
| 2009/0312063 A1 | 12/2009 | Soto Nicolas | | |
| 2010/0082784 A1* | 4/2010 | Rosenblatt | .......... | H04L 12/2812 709/222 |
| 2010/0312817 A1* | 12/2010 | Steakley | ................... | G06F 8/61 709/202 |
| 2012/0299847 A1 | 11/2012 | Kwon | | |
| 2013/0007842 A1 | 1/2013 | Park | | |

OTHER PUBLICATIONS

Final U.S. Office Action for parent U.S. Appl. No. 14/302,654 dated Feb. 24, 2016.

* cited by examiner

FIG. 13C
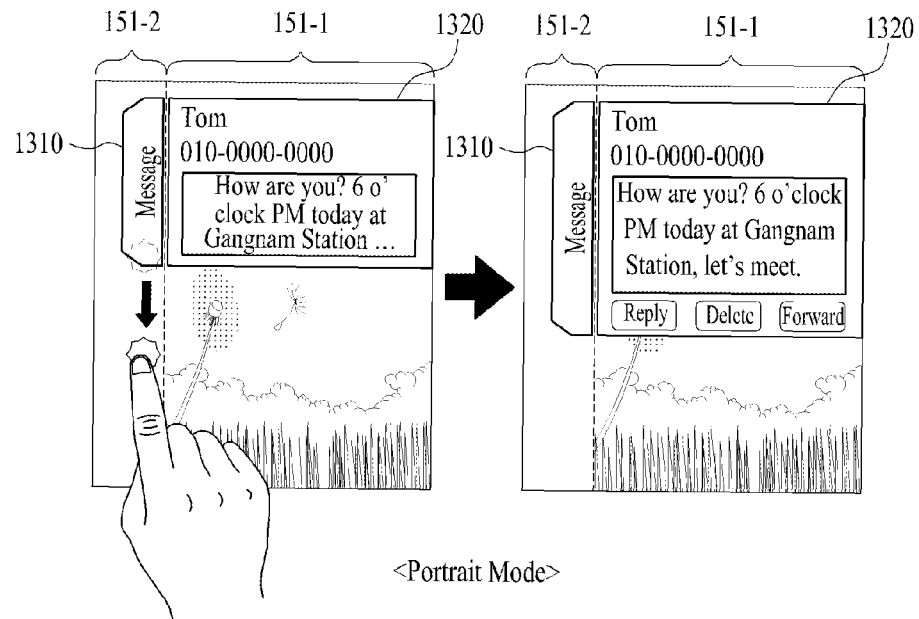
<Portrait Mode>
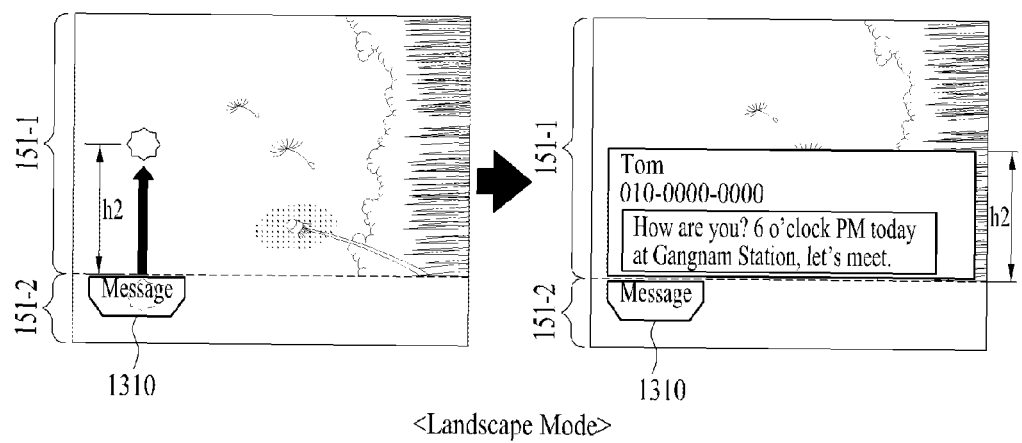
<Landscape Mode>

(a)

FIG. 23
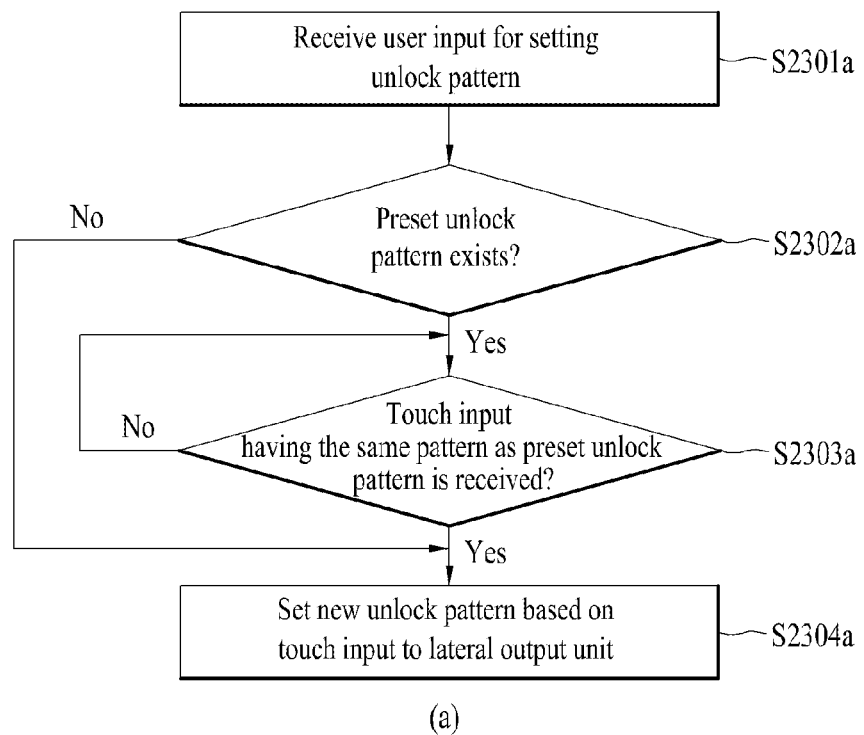
(a)
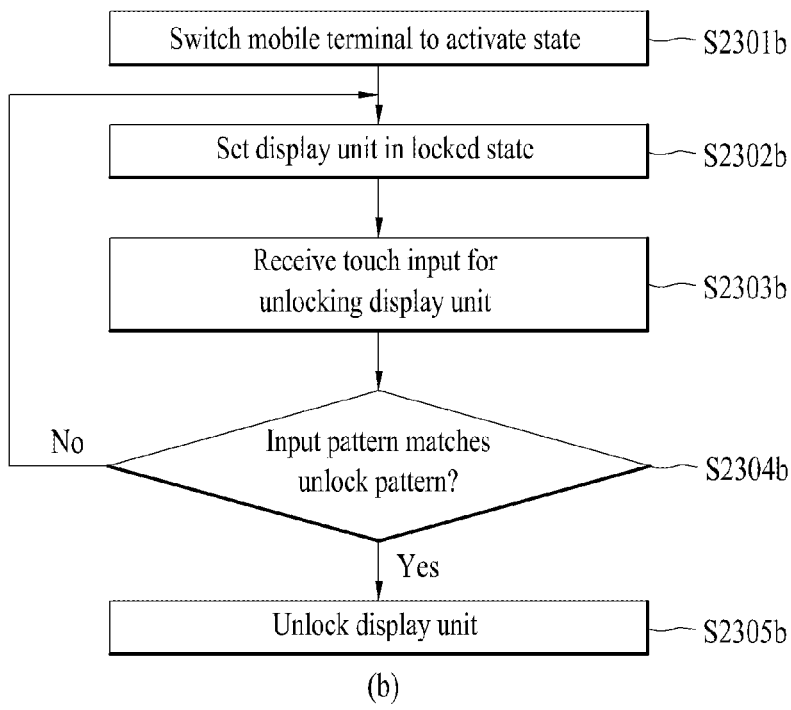
(b)

FIG. 25
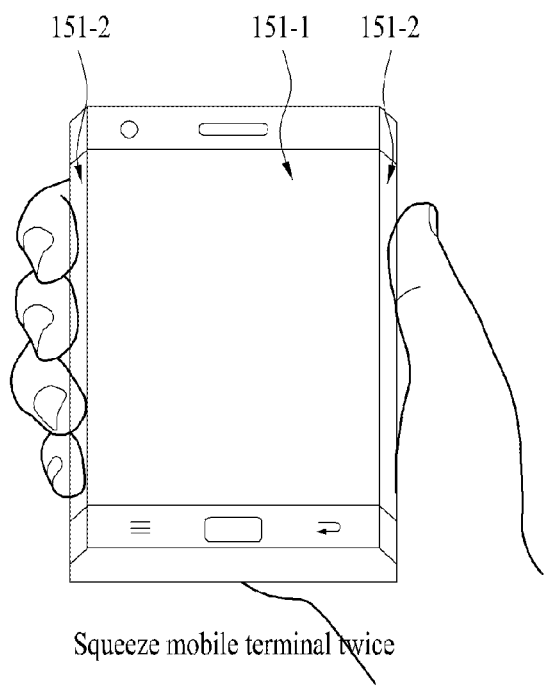
(a)
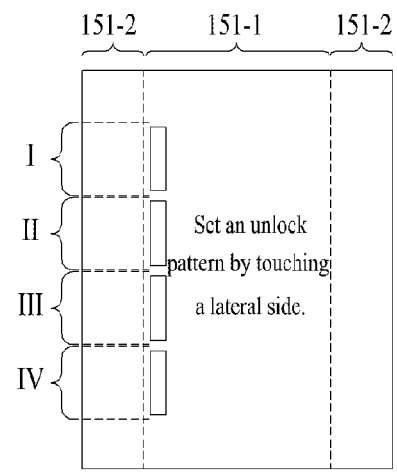
(b)
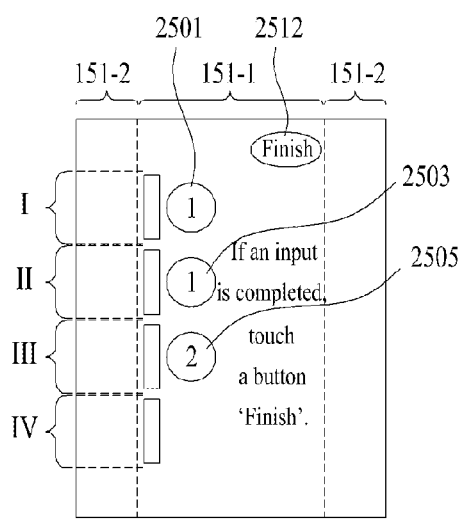
(c)
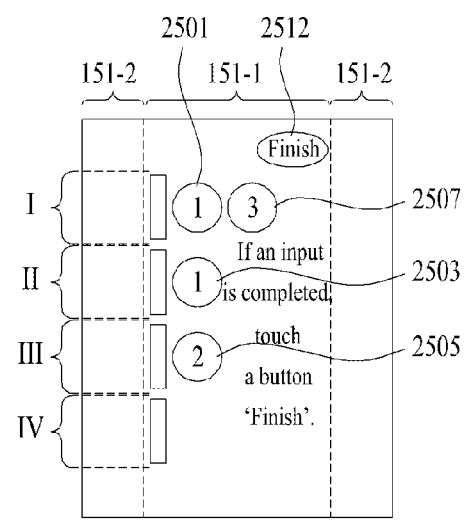
(d)

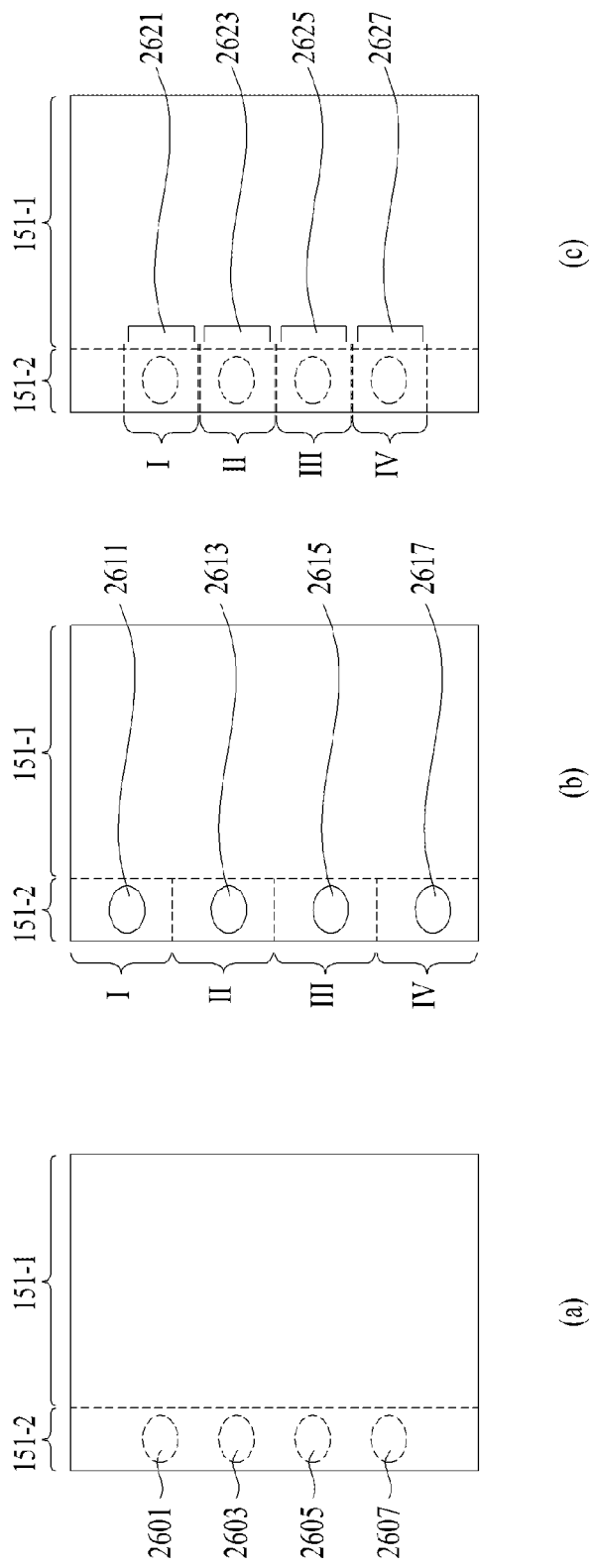

FIG. 27B
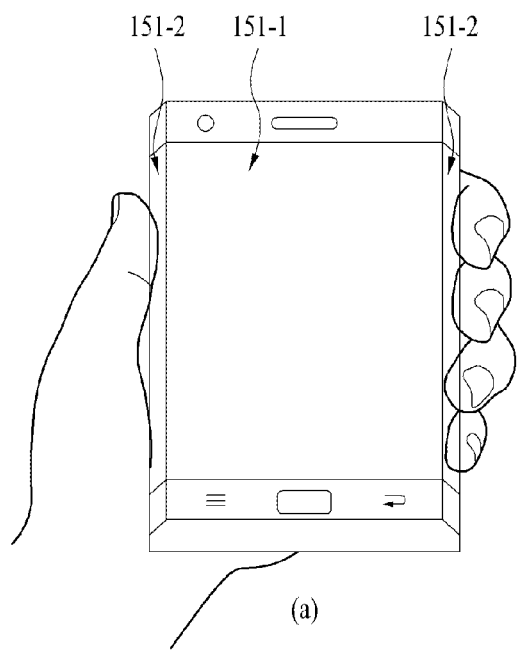
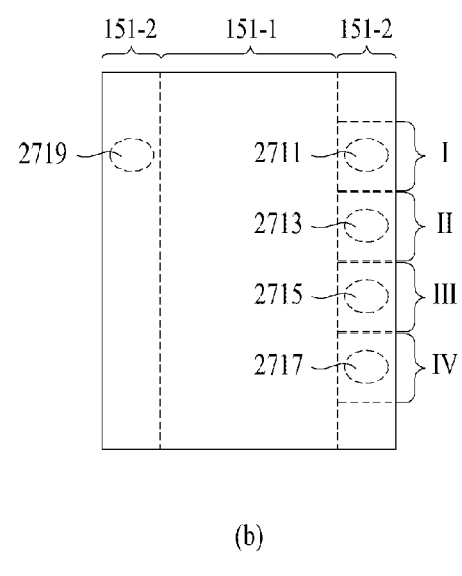

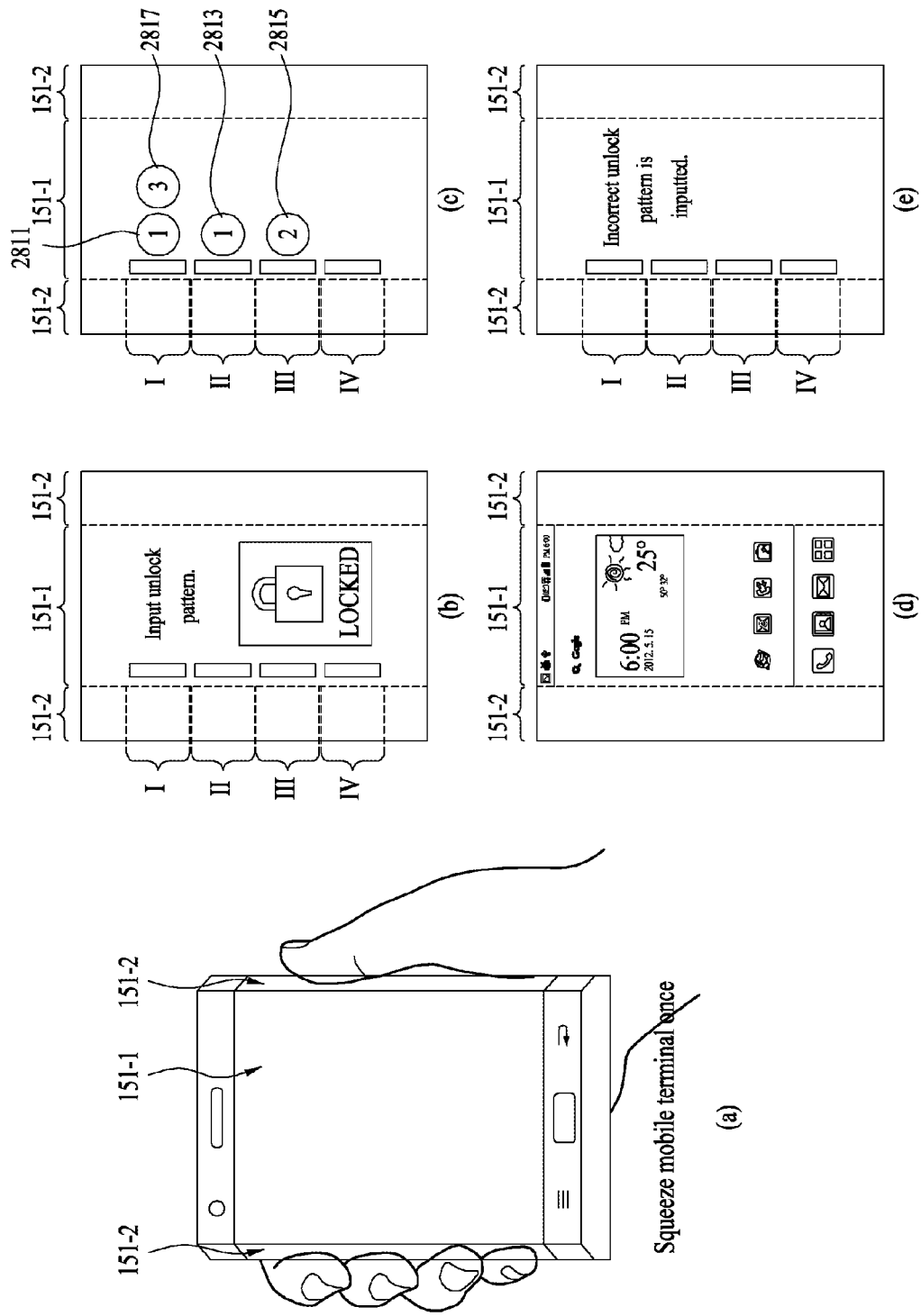

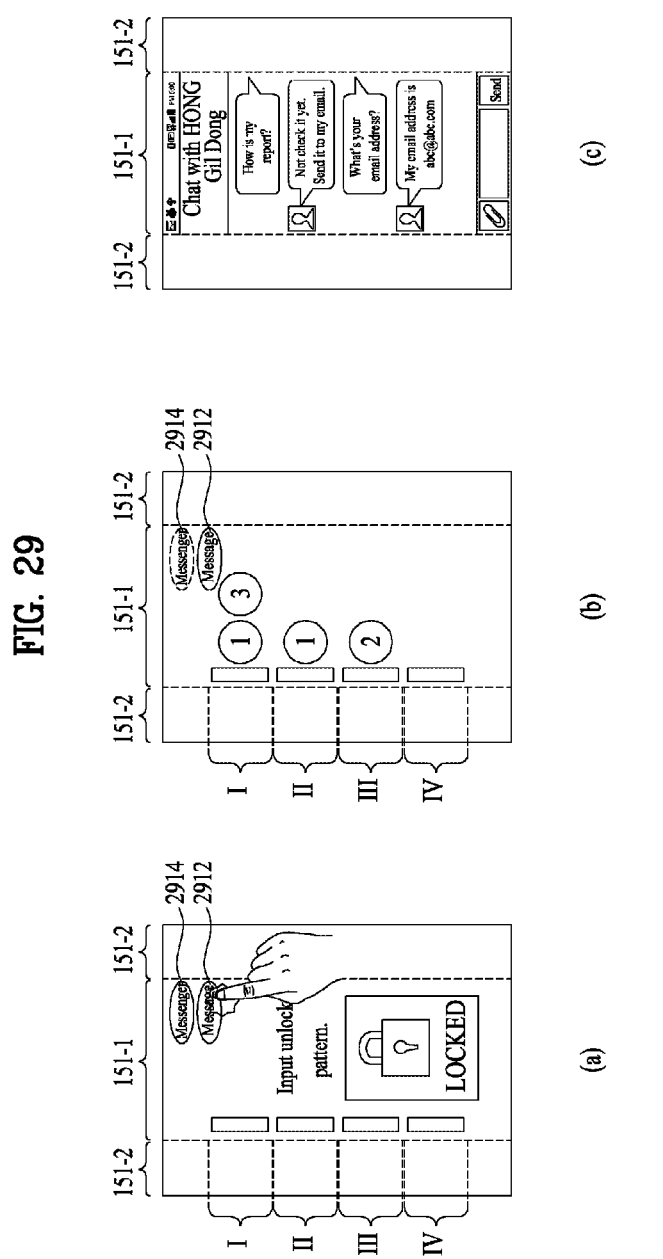

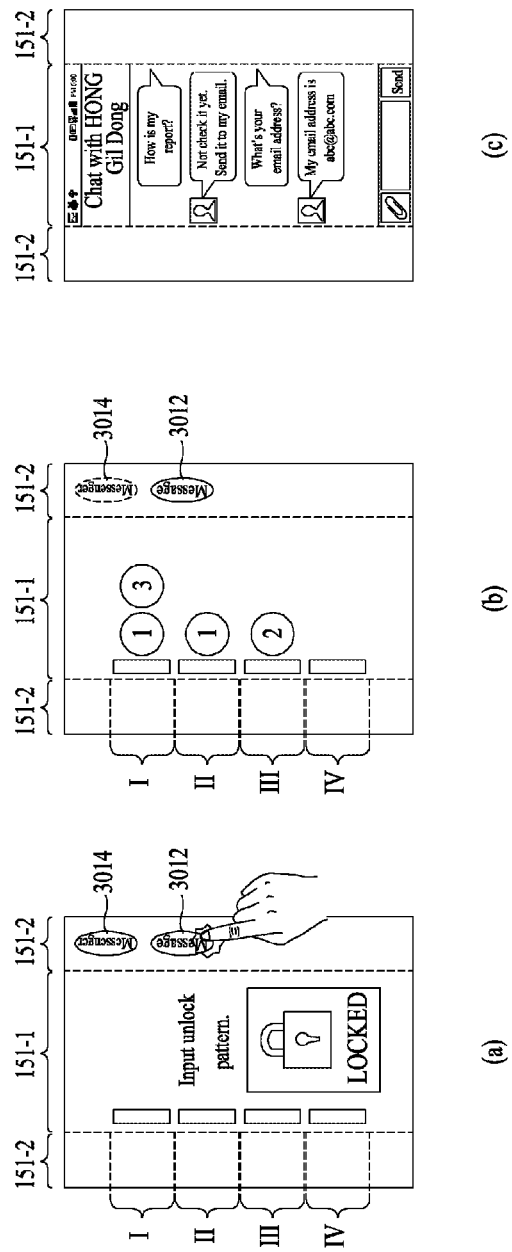

MOBILE TERMINAL AND CONTROLLING METHOD THEREOF

CROSS-REFERENCE TO RELATED APPLICATIONS

This application is a Continuation Application of prior U.S. patent application Ser. No. 14/302,654 filed Jun. 12, 2014, which claims priority under 35 U.S.C. §119 to Korean Application No. 10-2013-0068309, filed on Jun. 14, 2013, and Korean Application No. 10-2013-0070959, filed on Jun. 20, 2013, whose entire disclosures are hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for outputting an alarm indicating an occurrence of an event and facilitating a content or substance of the occurring event to be checked.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Generally, a mobile terminal has a configuration in hexagonal shape. Yet, owing to the recent development of a flexible display, it has been attempted to develop a method of diversifying a shape of a mobile terminal. For instance, if a flexible display is adopted, it is able to develop a mobile terminal having a cylindrical shape that casts off a traditional hexagonal shape.

If a mobile terminal casts off a traditional hexagonal shape owing to the development of a flexible display, it may mean that a display does not need to be provided to a front side of the mobile terminal. Hence, the demand for the development of a new UI (user interface) applicable to a flexible display adopted mobile terminal is increasingly rising.

BRIEF DESCRIPTION OF THE DRAWINGS

The embodiments will be described in detail with reference to the following drawings in which like reference numerals refer to like elements wherein:

FIGS. 13A to 13C are diagrams for various examples related to a size of an event display region;

FIG. 23 is a flowchart for an unlocking method of a mobile terminal according to one embodiment of the present invention;

FIG. 25 is a diagram for one example to describe a process for setting an unlock pattern;

FIG. 26 is a diagram for one example to describe a touch region;

FIG. 27A and FIG. 27B are diagrams for one example to describe a touch region set location if a mobile terminal includes a plurality of lateral output units;

FIG. 28 is a diagram for one example to describe a process for unlocking a display unit;

FIG. 29 is a diagram for one example to describe an operation of a mobile terminal if a display unit is unlocked in an object selected state;

FIG. 30 is a diagram for one example of a use in displaying an object through a lateral output unit;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
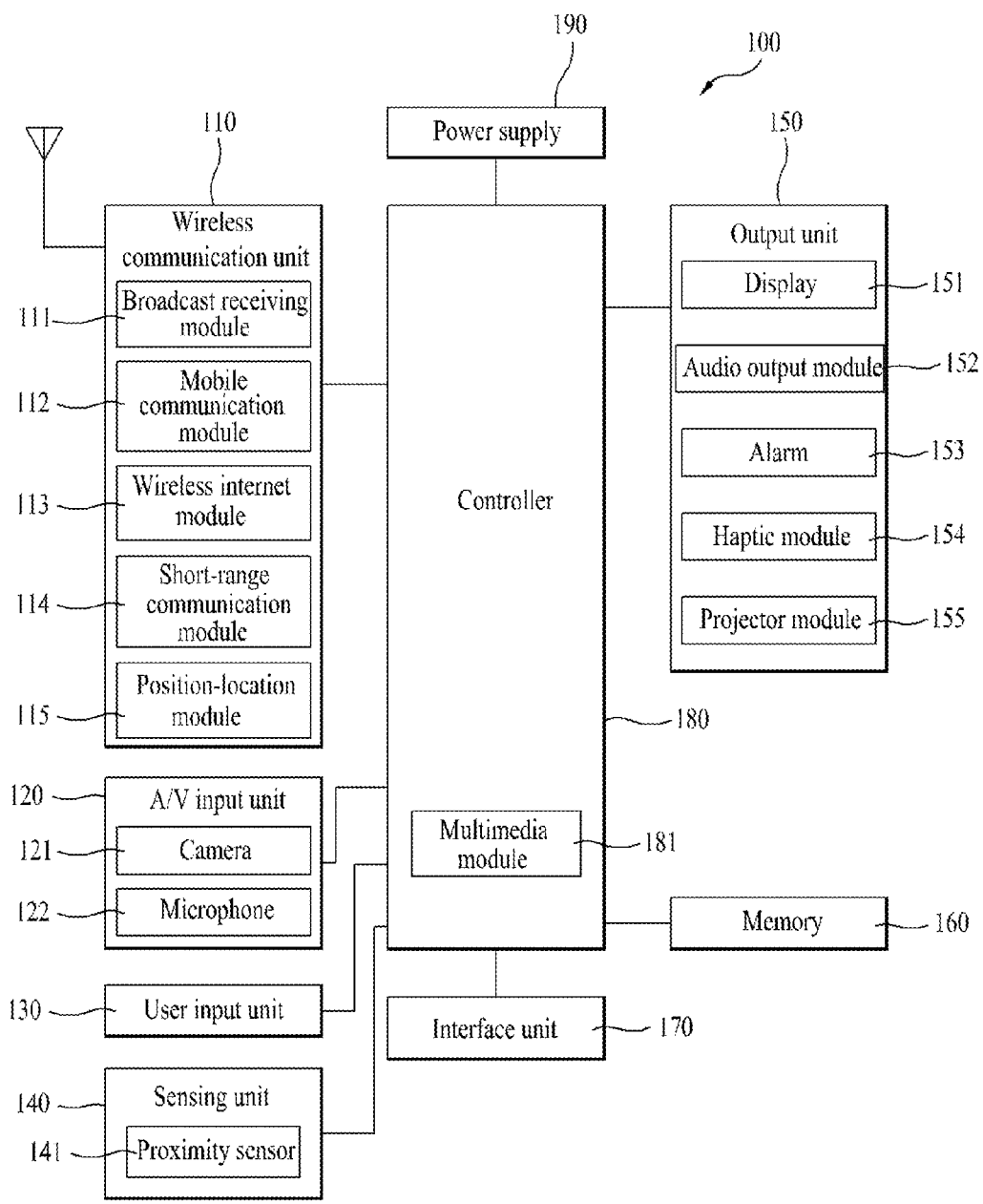
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (W-Fi), Wbro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
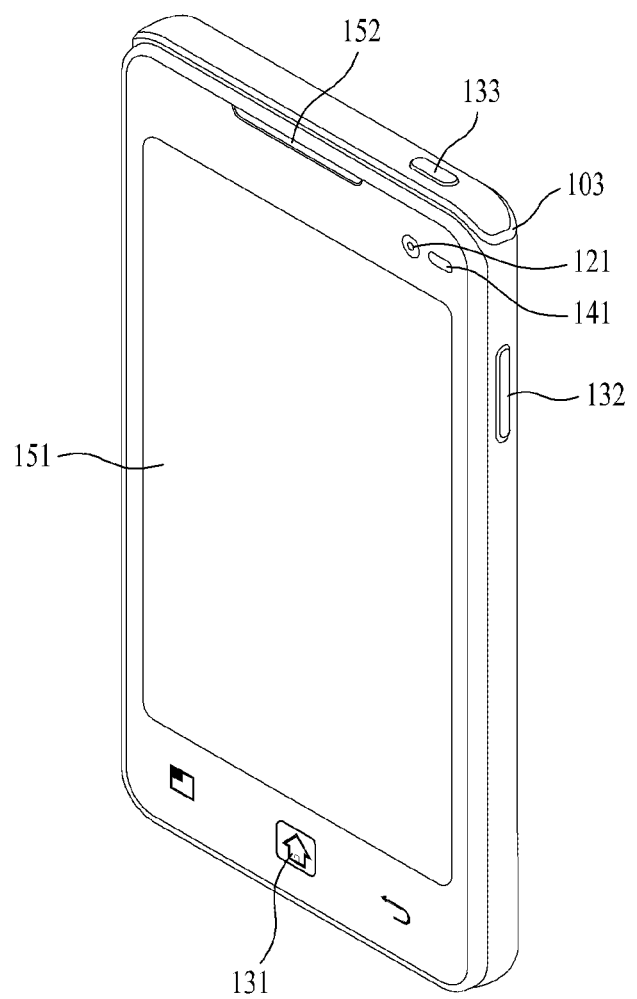
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
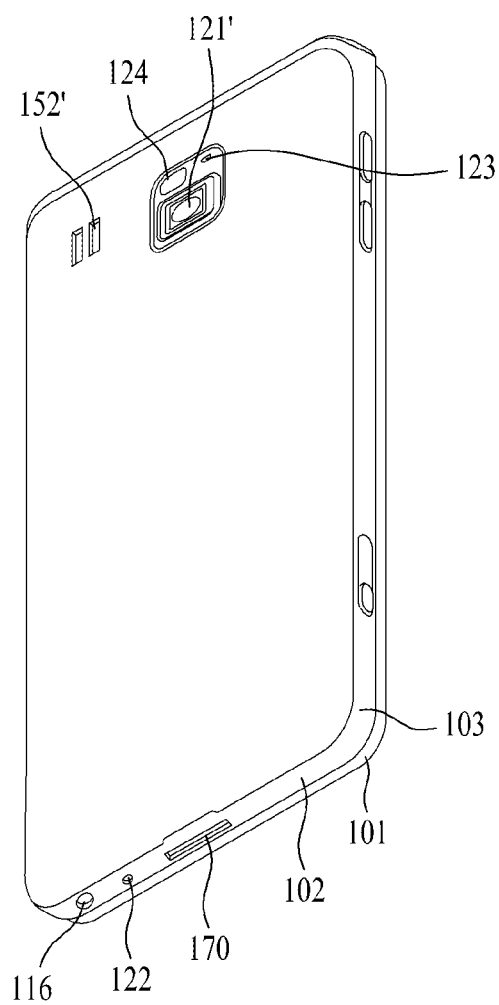
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal according to the present invention includes the wireless communication unit 110, the display unit 151, the storage unit (i.e., memory) 160 and the controller 180. In some cases, assume that the mobile terminal 100 according to the present invention further includes the sensing unit 140 belonging to the components shown in FIG. 1.

The display unit 151 of the mobile terminal 100 according to the present invention may include a front output unit exposed through a front side of the mobile terminal 100 and at least one lateral output unit exposed through a lateral side of the mobile terminal 100.

Figure 4:
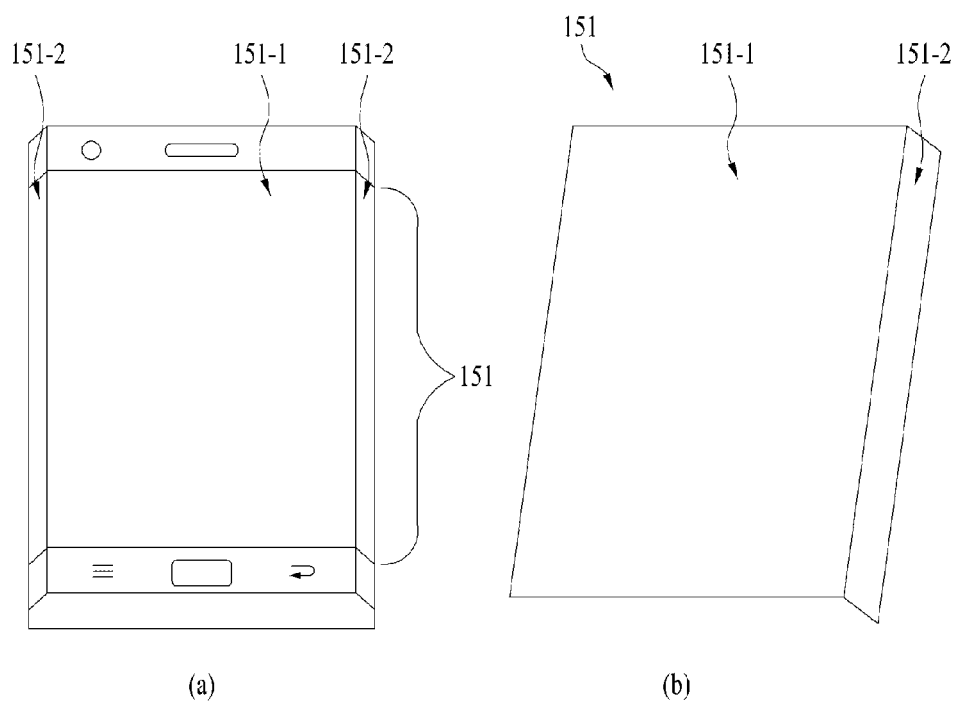
FIG. 4 is a diagram for one example to describe a front output unit and a lateral output unit.

For instance, FIG. 4 is a diagram for one example to describe a front output unit and a lateral output unit.

Referring to FIG. 4(*a*), a front output unit 151-1 may mean a display region exposed through a front side of the mobile terminal 100. And, a lateral output unit 151-2 may mean a display region exposed through a lateral side of the mobile terminal 100.

Each of the front output unit 151-1 and the lateral output unit 151-2 can be implemented with a separate electronic part. On the other hand, in case that the display unit 151 includes a flexible display configured freely bendable, the front output unit 151-1 and the lateral output unit 151-2 can be configured in a manner of bending at least one end of the flexible display.

For instance, FIG. 4(*b*) shows one example that the front output unit 151-1 and the lateral output unit 151-2 are configured by bending at least one end of the flexible display. Referring to FIG. 4(*b*), if at least one end of the flexible display unit 151 is bended, a flat region can configure the front output unit 151-1 while a bent region can configure the lateral output unit 151-2.

The lateral output unit 151-2 may be provided to each of left and right lateral sides of the mobile terminal [FIG. 4(*a*)]. Alternatively, the lateral output unit 151-2 may be provided to one of the left and right lateral sides of the mobile terminal [FIG. 4(*b*)].

If the display unit 151 of the mobile terminal 100 is implemented with a touchscreen, the implementation of the present invention can be further facilitated. Hence, for clarity of the following description, assume that the display unit 151 in the following description of the present invention includes the touchscreen.

In the following description, the present invention is explained in detail with reference to the accompanying drawings including the flowcharts for operations of the mobile terminal 100.

Figure 5:
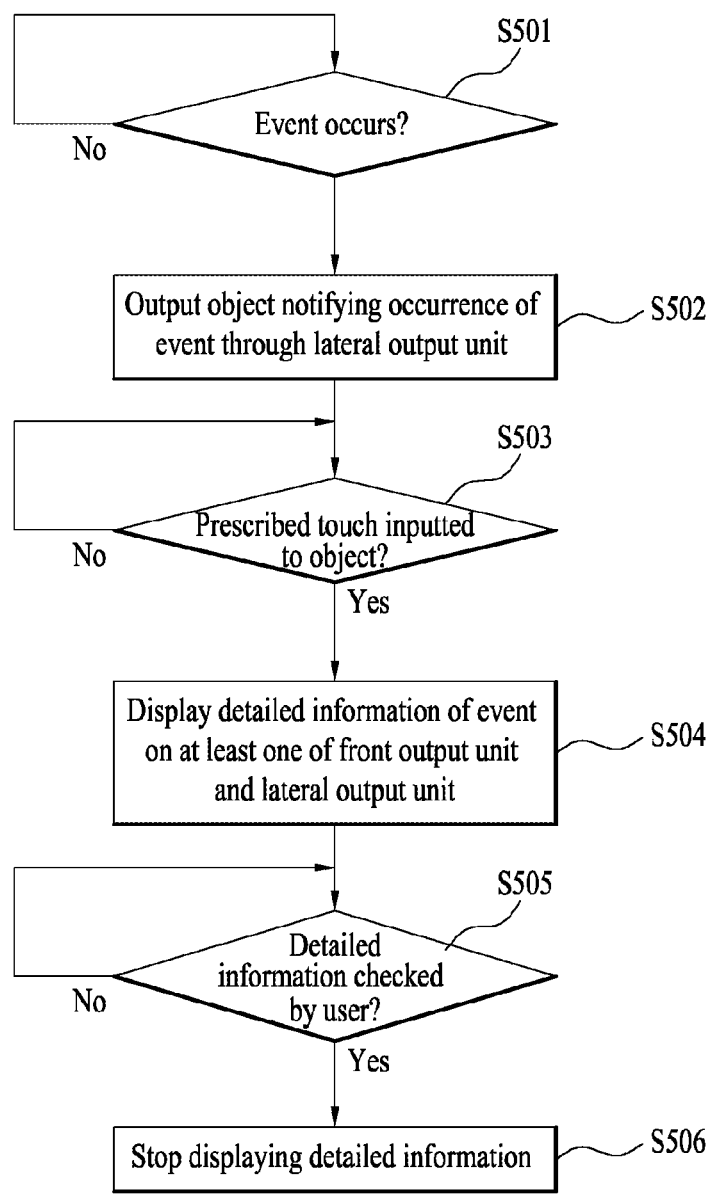
FIG. 5 is a flowchart for an operation of a mobile terminal according to the present invention.

FIG. 5 is a flowchart for an operation of a mobile terminal according to the present invention.

Referring to FIG. 5, if an event occurs [S501], the controller 180 can control an object, which indicates that the event has occurred, to be displayed on a lateral output unit [S502].

The event mentioned in the description of the present invention can include at least one of a case of receiving a message [e.g., a text message (e.g., SMS, LMS, MMS, etc.), an instant message, an email, etc.] externally, a case of receiving a push message from an external server, a case of an incoming call, a case of notifying a presence of a missed call, a case of subscribing a new posting at an SNS (social network service) account of a user, a case that a current hour is a preset alarm time, a case that a current location is a location nearby a preset location, a case that a current location is a location nearby a place for holding a pre-registered schedule, a case that the mobile terminal 100 enters a radio shadow area, a case that the mobile terminal 100 used to be located in a radio shadow area escapes from the radio shadow area, and the like.

The object notifying the occurrence of the even can be outputted as at least one of an icon, an indicator, a tab, a text and the like from the lateral output unit. For clarity of the following description, assume that an object (hereinafter named a notification tab) in a tab shape is displayed to notify an occurrence of an event. One example of a process for displaying a notification tab on a lateral output unit is described in detail with reference to FIG. 6 as follows.

Figure 6:
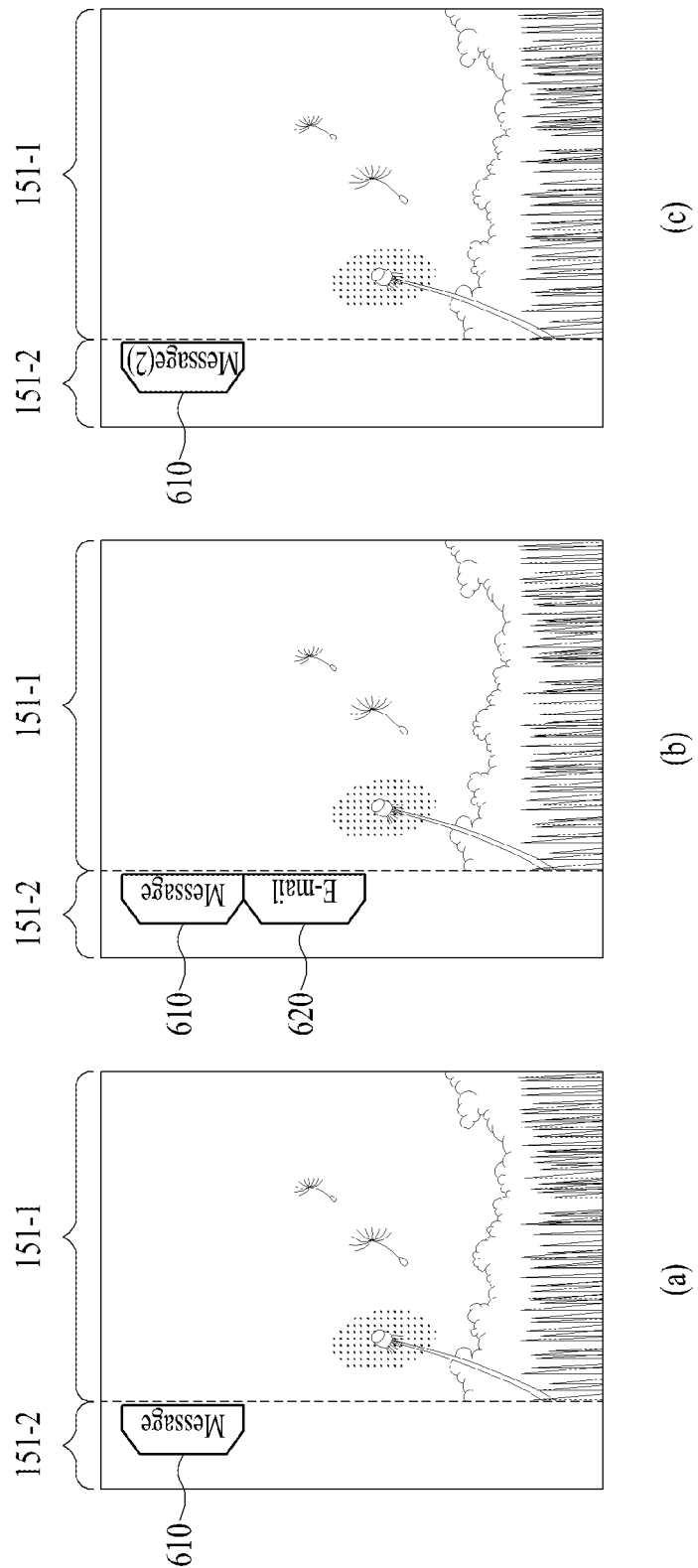
FIG. 6 is a diagram for one example to describe that a notification tab is displayed on a lateral output unit.

FIG. 6 is a diagram for one example to describe that a notification tab is displayed on a lateral output unit. For convenience in preparing the drawing, a lateral output unit 151-2 and a front output unit 151-1 are discriminated from each other with reference to a virtual dotted line. And assume that the lateral output unit 151-2 is formed on one side of the mobile terminal 100 only. Moreover, assume that a prescribed image is currently displayed through the front output unit 151-1.

Referring to FIG. 6, if an event of externally receiving a text message occurs, the controller 180 can control a notification tab 610, which notifies that the text message has been received, to be displayed [FIG. 6(*a*)]. In doing so, if an event of externally receiving an email further occurs, the controller 180 can control a notification tab 620, which notifies that the email has been received, to be further displayed on the lateral output unit 151-2 [FIG. 6(*b*)]. While a notification tab corresponding to an event of a specific type is outputted through the lateral output unit 151-2, if an event of the same type further occurs, the controller 180 can control the number of event occurrences to be displayed on the notification tab 610 [FIG. 6(*c*)].

The controller 180 can control at least one of a type of an event and a counterpart having triggered the event to be identified through the notification tab. For instance, referring to FIG. 6, the controller 180 outputs a text string for identifying a type of an occurring event to the notification tab 610/620, thereby controlling the type of the occurring event to be identified through the notification tab 610/620. In this case, the text string for identifying the type of the event may include a text string (e.g., Message, Email, etc.) indicating a type of the received data or a title (e.g., Message, Facebook, Twitter, etc.) associated with the occurrence of the event. Moreover, the controller 180 can control a text string (e.g., a name of a counterpart having sent a message, an ID (identity) of the counterpart, etc.) to be displayed on the notification tab [not shown in the drawing].

Besides, the controller 180 can control a type of an event or a counterpart, who has triggered the event, to be identified in accordance with a color of the notification tab or an icon outputted from the notification tab.

When a plurality of events occur, if a plurality of notification tabs 610 and 620 are displayed on the lateral output unit 151-2, referring to FIG. 6(*b*), the controller 180 can control the notification tab, which corresponds to a most recently occurring event, to be identified. For instance, the controller 180 controls a specific one 620 of the two notification tabs 610 and 620, which corresponds to a most recently occurring event (e.g., a reception of an email), to blink, thereby enabling a user to recognize the most recently occurring event.

A display location of a notification tab on a lateral output unit can be changed by a user input. For instance, FIG. 7 is a diagram for one example to describe that a display location of a notification tab is changed by a user input.

Figure 7:
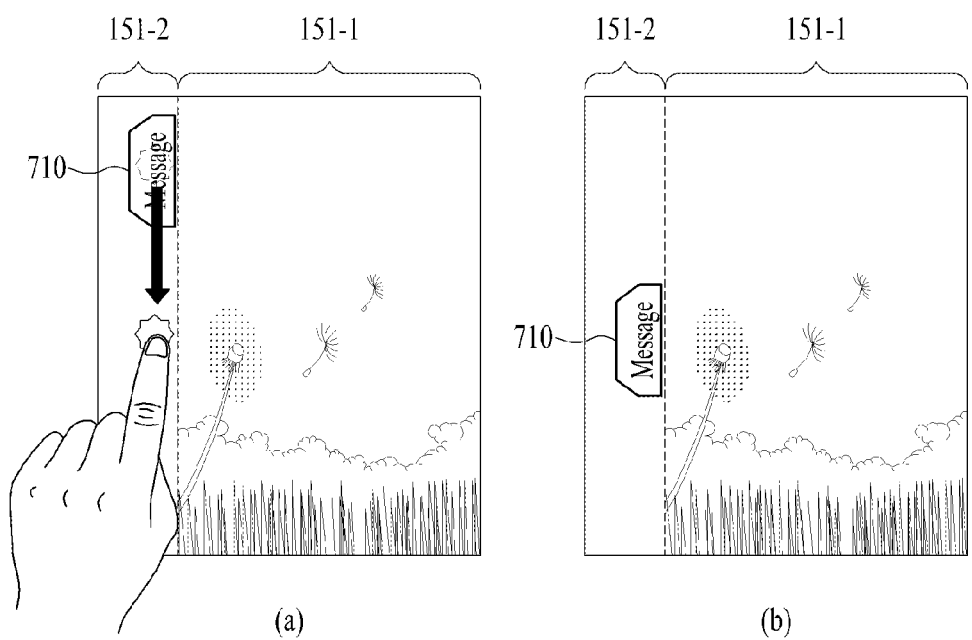
FIG. 7 is a diagram for one example to describe that a display location of a notification tab is changed by a user input.

Referring to FIG. 7, if a user touches a notification tab 710 displayed on a lateral output unit 151-2 and then drags the touched notification tab 710 to a desired location on the lateral output unit 151-2 [FIG. 7(*a*)], the controller 180 can control the notification tab 710 to be displayed at the desired location to which the notification tab 710 is dragged [FIG. 7(*b*)]. Of course, it is able to change display locations of a plurality of the notification tabs at a time [not shown in the drawing].

Referring now to FIG. 5, if a prescribed touch input (hereinafter named a first touch input) for checking a detailed information on the event is applied to the object (e.g., the notification tab) displayed on the lateral output unit [S503], the controller 180 can control the detailed information on the event to be displayed through at least one of the lateral output unit and the front output unit [S504].

In this case, the first touch input can be configured with at least one of an action of touching a notification tab, an action of consecutively touching a notification tab plural times, an action of touching and dragging a notification tab, an action of touching a notification tab and then dragging a pointer toward the front output unit, an action of dragging a pointer in a first direction along a trace of traversing a notification tab, and the like. Aside from the above-enumerated gestures, it is a matter of course that gestures of various types easily devisable by those skilled in the art can be set as the first touch input.

In response to a first touch input, an embodiment for displaying a detailed information of an event through at least one of a lateral output unit and a front output unit shall be described with reference to the accompanying drawing as follows.

Figure 8:
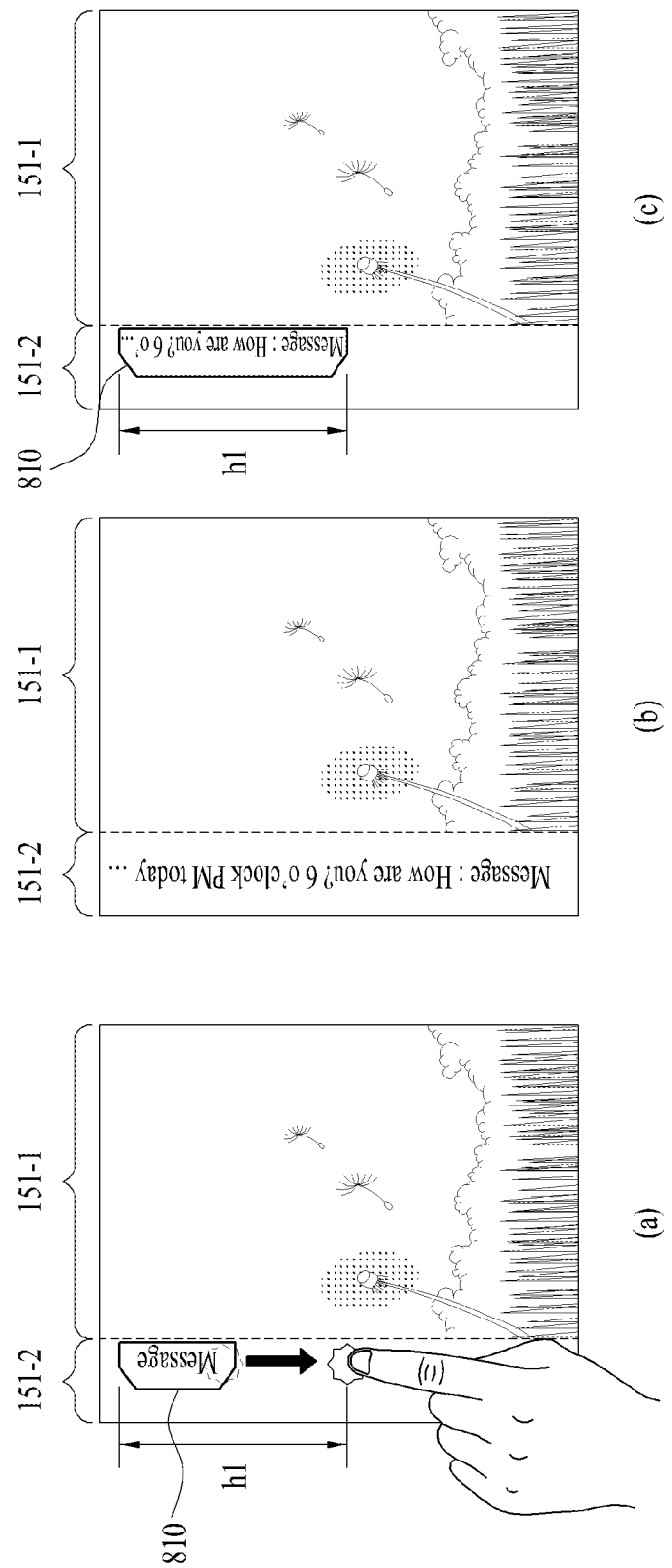
FIG. 8 is a diagram for one example to describe that a detailed information on an event is displayed through a lateral output unit.

FIG. 8 is a diagram for one example to describe that a detailed information on an event is displayed through a lateral output unit. For clarity of the following description, assume that a first touch input includes an action performed in a manner of touching an end portion of a prescribed side of a notification tab 810 and then dragging a pointer outside the notification tab 810.

Referring to FIG. 8, if a first touch input is applied to a notification tab 810 [FIG. 8(*a*)], the controller 180 can control a detailed information on an event to be outputted through a lateral output unit 151-2 [FIG. 8(*b*)].

In this case, the detailed information on the event may include a content of an externally received message, an information (e.g., a name of a counterpart, a phone number of the counterpart, a photo of the counterpart, etc.) on the counterpart of an incoming call, an information on a counterpart of a missed call in case of a presence of the missed call, a content of a new posting subscribed at an SNS account of a user, a content of an alarm on a current hour corresponding to an alarm time, a content of a schedule on a current hour corresponding to a time at which a pre-registered schedule begins, a content indicating that a preset location is entered in case of a current location corresponding to a location nearby a preset location, a content notifying an entry of the mobile terminal 100 into a radio shadow area, a content notifying that the mobile terminal 100 escapes from a radio shadow area, and the like.

In outputting the detailed information on the event, referring to FIG. 8(*c*), the controller 180 can control the detailed information on the event to be displayed on the notification tab 810. In doing so, the controller 180 can control the detailed information, of which size is appropriate for the notification tab 810, to be displayed on the notification tab 810 by increasing a size of the notification tab 710.

As mentioned in the foregoing description with reference to FIG. 6(*c*), the notification tab 810 can indicate a plurality of events (e.g., if events of the same type occur plural times). In doing so, the controller 180 can control detailed informations on all of a plurality of the events to be displayed. Alternatively, while the detailed information on a prescribed one of a plurality of the events is displayed, if an appropriate user input (e.g., a touch to the notification tab) is applied, the controller 180 can control the detailed information on a next event to be displayed.

Based on the first touch input, the controller 180 can determine a size of the notification tab 810. For instance, if the first touch input includes an action performed in a manner of touching an end portion of one side of the notification tab 810 and then dragging a pointer outside the notification tab 810, referring to FIG. 8(*a*) and FIG. 8(*c*), the controller 180 can control the notification tab 810 to be extended to a point to which the pointer is dragged by a user.

For another instance, the controller 180 can increase a size of a notification tab by a preset amount. Alternatively, the controller 180 can automatically determine a size of a notification tab in accordance with a size of a detailed information on an event.

Figure 9:
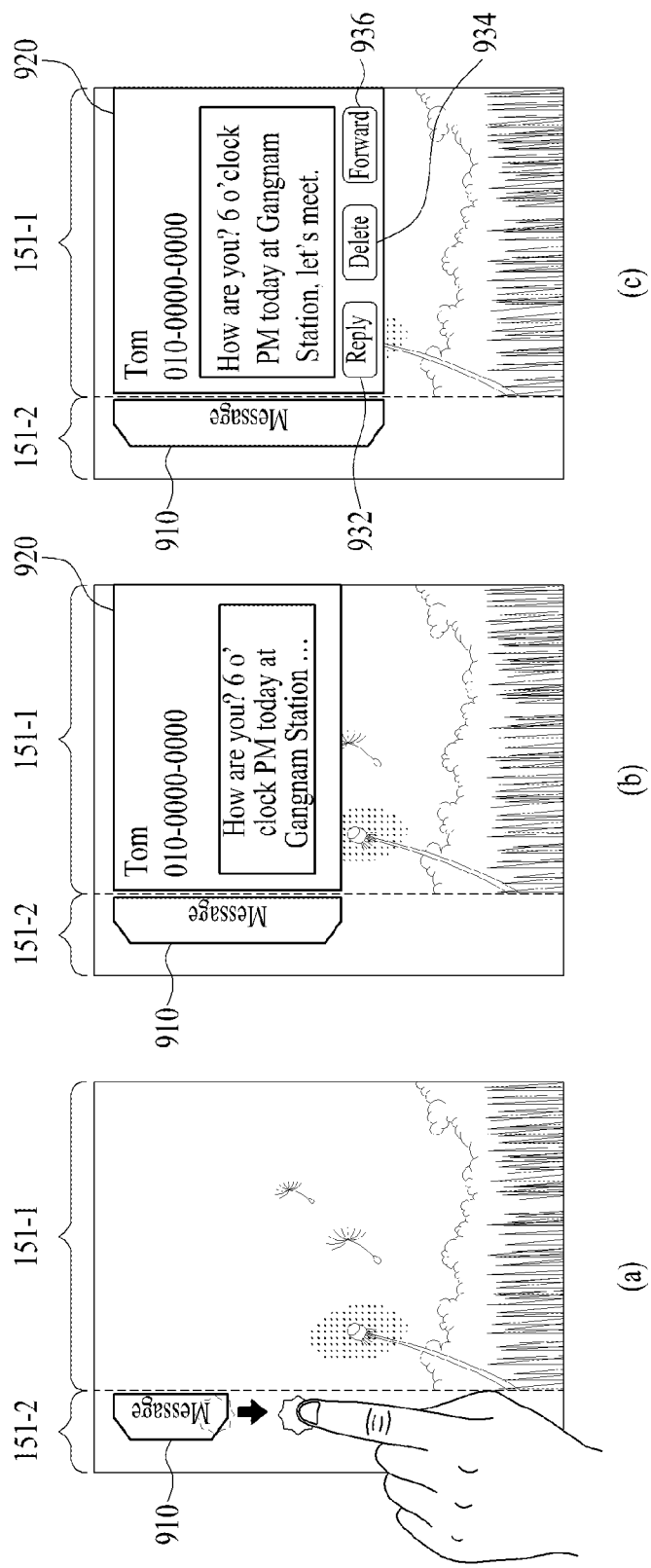
FIG. 9 is a diagram for one example to describe that a detailed information on an event is displayed through a front output unit.

FIG. 9 is a diagram for one example to describe that a detailed information on an event is displayed through a front output unit. For clarity of the following description, like the former example shown in FIG. 8, assume that a first touch input includes an action performed in a manner of touching a notification tab 910 and then dragging a pointer in a prescribed direction.

Referring to FIG. 9, if a first touch input is applied to a notification tab 910, the controller 180 sets an event display region 920, to which a detailed information on an event will be outputted, in a front output unit 151-1 [FIG. 9(*a*)] and is then able to control the detailed information on the event to be outputted through the event display region 920 [FIG. 9(*b*)]. Since the event display region 920 is small, if it is difficult to output the whole size of the detailed information on the event at a time, a user is able to check a non-outputted size of the detailed information on the event by scrolling the event display region 920 up and down (or right and left). If it is unable to output the whole size of the detailed information on the event at a time, an action of dragging a pointer up and down (or right and left) within the notification tab 910 can be recognized as an action for scrolling the event display region 920 up and down (or right and left).

In case that the notification tab 910 indicates a plurality of events, detailed informations on a plurality of the events are displayed. Alternatively, as mentioned in the foregoing description, while a detailed information on one of a plurality of the events is displayed, if an appropriate user input (e.g., a touch to the notification tab) is applied, the detailed information on the next event can be displayed.

The event display region 920 may be dependent on the notification tab 910 of a lateral output unit 151-2. In particular, assuming that the notification tab 910 previously outputted through the lateral output unit 151-2 sweeps over the front output unit 151-1 in a straight line, a region of the front output unit 151-1 over which the notification tab 910 has swept can be understood as matching the event display region 920. Since the event display region 920 is dependent on the notification tab 910, a size and location of the event display region 920 can be adjusted in accordance with a size and location of the notification tab 910.

For instance, referring to FIG. 9(b) and FIG. 9(c), the size of the event display region 920 can increase in proportion to that of the notification tab 910. As the size of the event display region 920 increases, more detailed information on the event can be outputted at a time. As mentioned in the foregoing description, a size of the notification tab 910 can be manually adjusted by a user. Alternatively a size of the notification tab 910 can be adjusted automatically in accordance with an output size of the detailed information on the event.

Operation buttons 932, 934 and 936 for processing an occurring event can be provided to the event display region 920 as well as the detailed information on the event. For instance, if the occurring event is a reception of a message, referring to FIG. 9(c), the controller 180 can control the event display region 920 to display operation buttons including a reply button 932 for sensing a reply message to a message sender, a delete button 934 for deleting a received message, a forward button 936 for forwarding a received message to others, and the like.

If a prescribed one of the operation buttons 932, 934 and 936 is touched, the controller 180 can perform an operation corresponding to the touched prescribed operation button. For instance, if the reply button 932 shown in FIG. 9(c) is touched, an operation for sending a reply message to a message sender may be performed. If the delete button 934 is touched, an operation of deleting a received message from a memory can be performed. If the forward button 936 is touched, an operation of forwarding a received message to another person can be performed.

In an operation button displayed through an event display region is touched, the controller 180 activates an application appropriate for performing an operation corresponding to the touched operation button and is then able to control a front output unit to output an active screen of the application. And, the controller 180 can control a processing screen configured to perform the corresponding operation to be displayed on a front output unit by overlay. This is described in detail with reference to FIG. 10 and FIG. 11 as follows.

Figure 10:
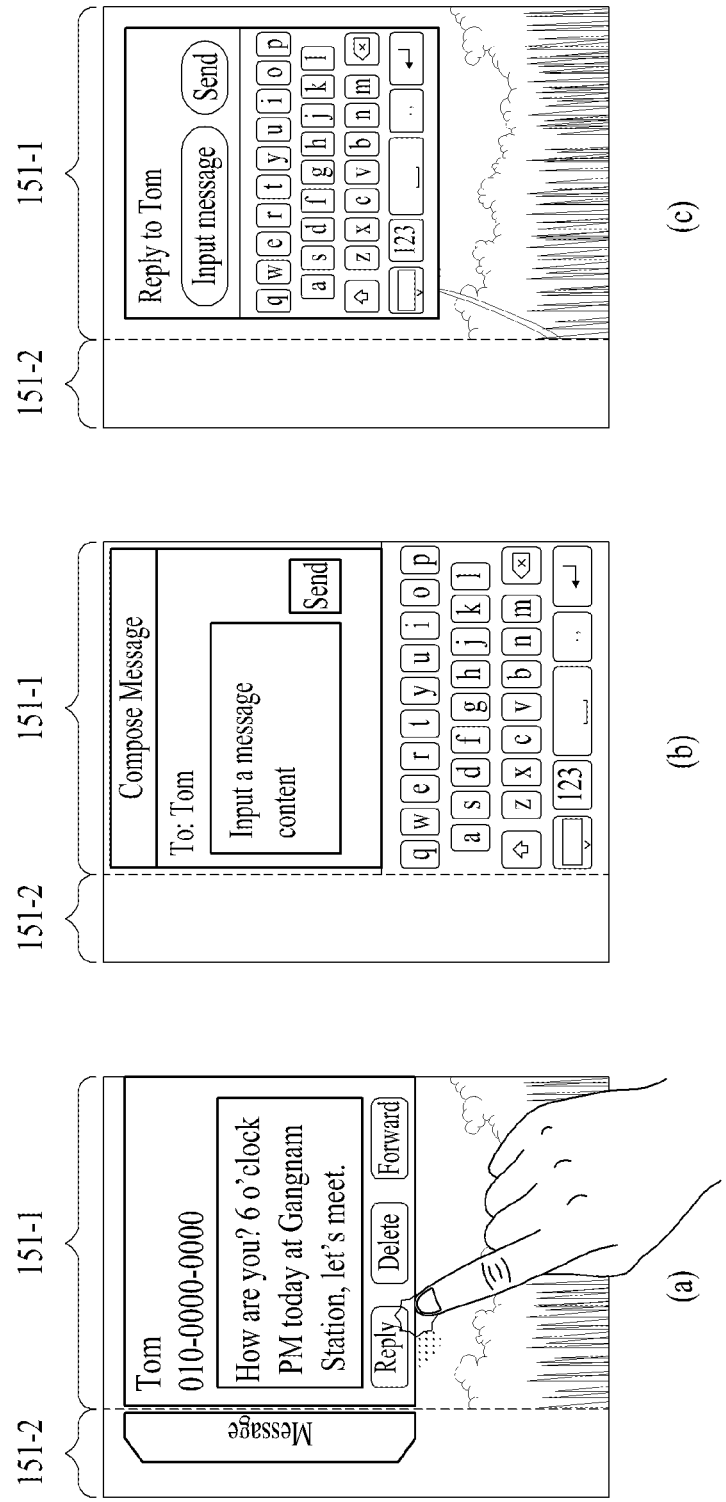
FIG. 10 and FIG. 11 are diagrams for one example to describe an operation of a mobile terminal if an operation button for processing an occurring event is touched.
Figure 11:
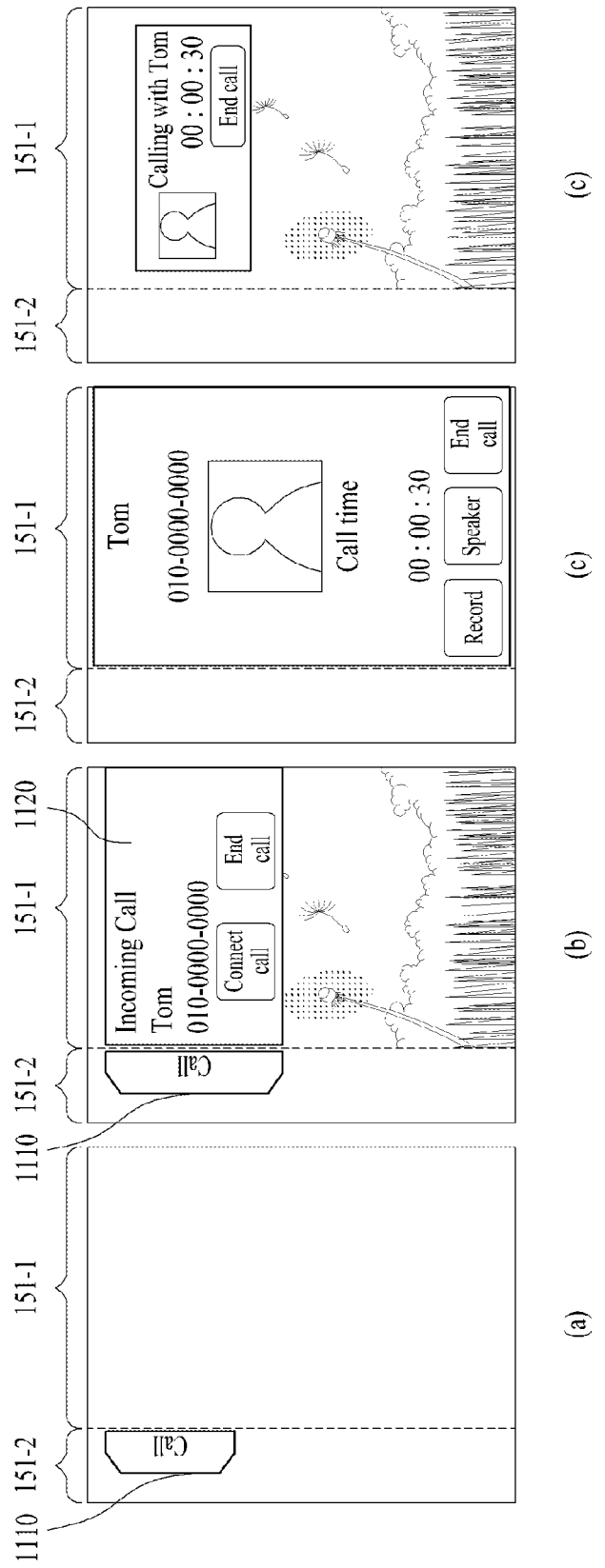

FIG. 10 and FIG. 11 are diagrams for one example to describe an operation of the mobile terminal 100 if an operation button for processing an occurring event is touched.

FIG. 10 shows one example of a case that an occurring event is a message reception. And, FIG. 11 shows one example of a case that an occurring event is an incoming call.

For clarity of the following description, according to the embodiments shown in FIG. 10 and FIG. 11, assume that touched operation buttons include a reply button for sending a reply message in response to a received message and a call connection button for answering an incoming call.

Referring to FIG. 10, if a reply button is touched [FIG. 10(a)], the controller 180 activates a message application for composing a reply message and is also able to control an active screen of the message application to be displayed through a front output unit 151-1. In doing so, a reply screen for composing a reply message to a message sender may be outputted as a full screen from the front output unit 151-1.

If the reply button is touched [FIG. 10(a)], the controller 180 may control a reply screen to be displayed in a manner of overlaying an information [e.g., a prescribed image shown in FIG. 10(c)] displayed on the front output unit 151-1 [FIG. 10(c)].

If an event of an incoming call occurs, referring to FIG. 11(a), the controller 180 can control a notification tab 1110, which notifies that there is an incoming call, to be displayed through a lateral output unit 151-2. If the incoming call is ended without being answered by a user, the controller 180 can control the notification tab 1110 notifying the presence of the incoming call to be changed into a notification tab notifying a presence of the missed call.

In order for the user to recognize the presence of the incoming call further clearly, the controller 180 can control the notification tab 1110 notifying the presence of the incoming call to be blinked. If a first touch input (e.g., an action of touching the notification tab 1110 and then dragging the notification tab 1110 in a prescribed direction, etc.) is applied to the notification tab 1110 notifying the presence of the incoming call, referring to FIG. 11(b), the controller 180 sets an event display region 1120 on a front display unit 151-1 and is then able to control an information on a counterpart making the phone call to be displayed through the event display region 1120. In doing so, the controller 180 can control the event display region 1120 to display operation buttons (e.g., a call connection button, a call end button, etc.) for processing the incoming call.

If the call connection button is touched, referring to FIG. 11(c), the controller 180 activates a call application and is also able to control an active screen of the call application to be displayed through the front output unit 151-1. In doing so, the controller 180 may be able to control a call screen to be displayed on the front output unit 151-1 while answering the incoming call.

If the call connection button is touched [FIG. 11(b)], the controller 180 makes a response to the incoming call and is also able to control a call screen to be displayed in a manner of overlaying the front output unit 151-1 [FIG. 11(d)].

If an operation button for processing an occurring event is touched, the controller 180 can activate an application appropriate for processing the occurring event [FIG. 10(b), FIG. 11(c)] and may control a processing screen for processing the occurring event to be displayed in a manner of overlaying the front output unit 151-1.

According to the examples described with reference to FIGS. 9 to 11, an operation button in an event display region is touched so that an occurring event can be processed. According to the present invention, although an operation button is not touched, the controller 180 can control an occurring event to be processed in response to a preset user's touch input. This is described in detail with reference to FIGS. 12A to 12E as follows.

FIGS. 12A to 12E are diagrams for one example to describe that an occurring event is processed in response to a preset user's touch input.

Figure 12A:
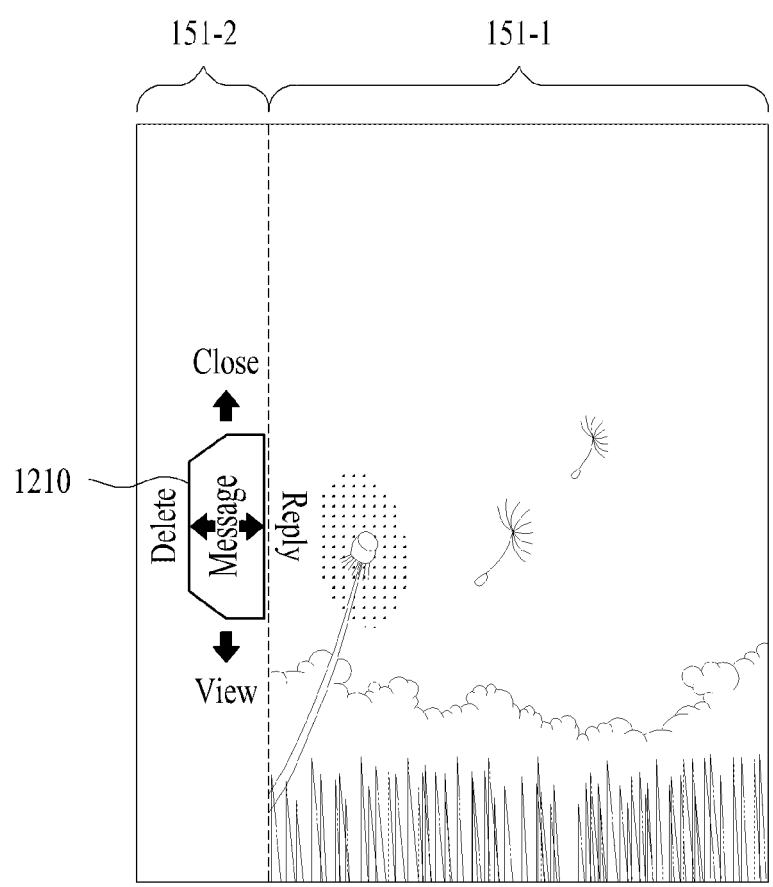
FIGS. 12A to 12E are diagrams for one example to describe that an occurring event is processed in response to a preset user's touch input.

Referring to FIG. 12A, the controller 180 of the present invention can determine a method of processing an occurring event based on a drag direction of a pointer with which a notification tab 1210 is touched. For clarity of the following description, assume that an event corresponding to the notification tab 1210 includes a reception of message.

Figure 12B:
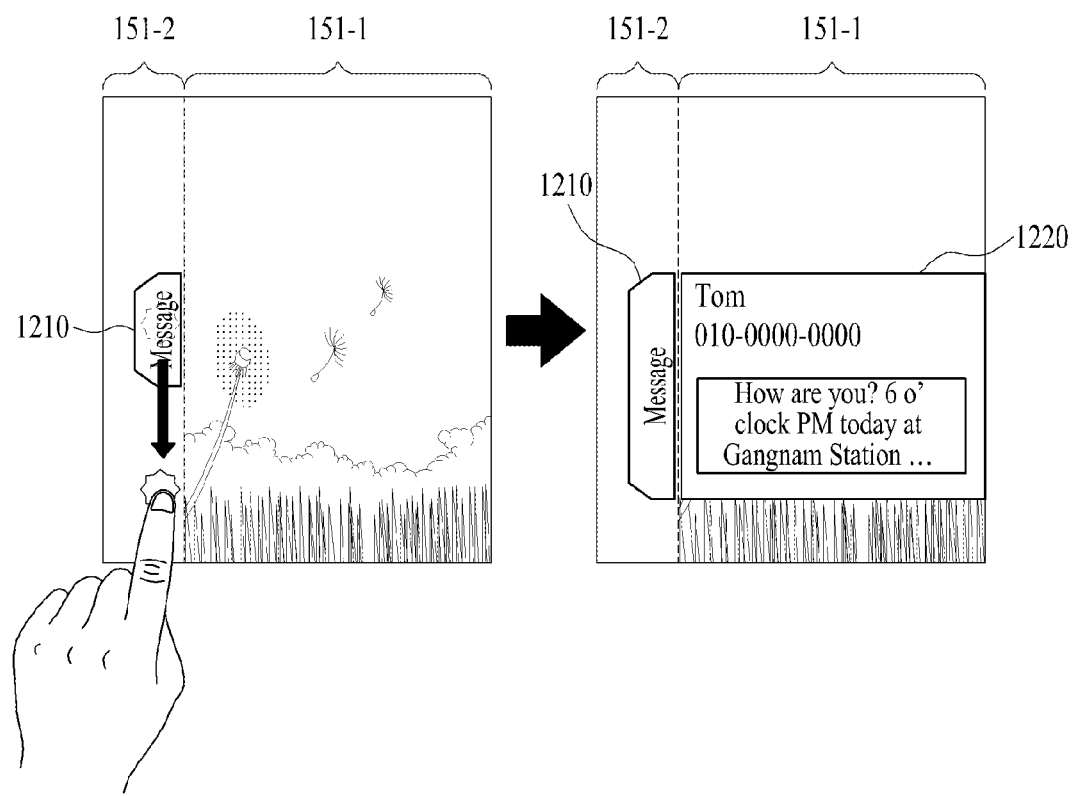

For instance, referring to FIG. 12B, if a pointer with which the notification tab 1210 is touched moves along a first direction of the lateral output unit 151-2, the controller 180 can control a detailed information on an occurring event to be displayed through at least one of the lateral output unit 151-2 and the front output unit 151-1. For instance, in the example shown in FIG. 12B, the detailed information on the event is displayed through an event display region 1220 of the front output unit 151-1.

Figure 12C:
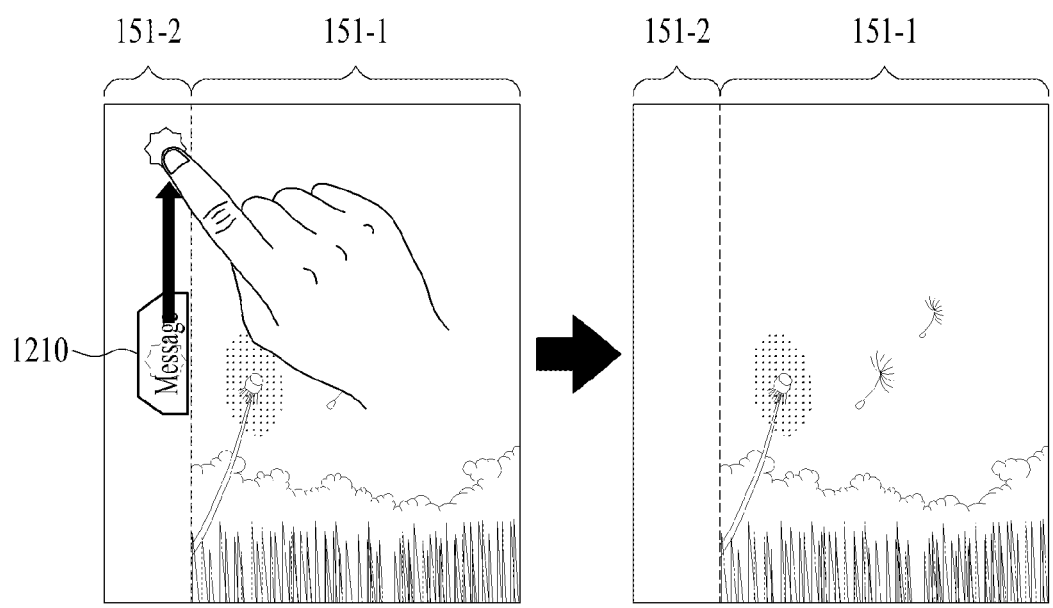

On the other hand, referring to FIG. 12C, if a pointer with which the notification tab 1210 is touched moves along a second direction of the lateral output unit 151-2, the controller 180 does not display the detailed information on the event but controls the notification tab 1210 to stop being displayed through the lateral output unit 151-2. Alternatively, the controller 180 can control a detailed information on a history (e.g., a previous message) of an event of the same type, which occurred right before the currently occurring event, to be displayed through at least one of the lateral output unit 151-2 and the front output unit 151-1.

Figure 12D:
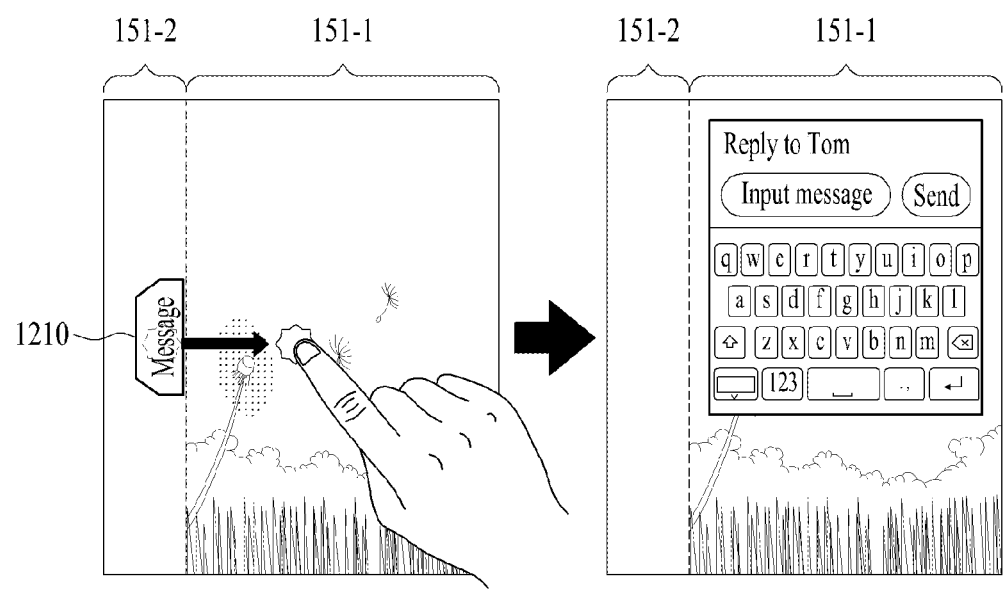

For another instance, referring to FIG. 12D, if a pointer with which the notification tab 1210 is touched is dragged in a third direction toward the front output unit 151-1, the controller 180 can control a reply screen, which is provided to compose a reply message in response to a received message, to be displayed on the front output unit 151-1.

Figure 12E:
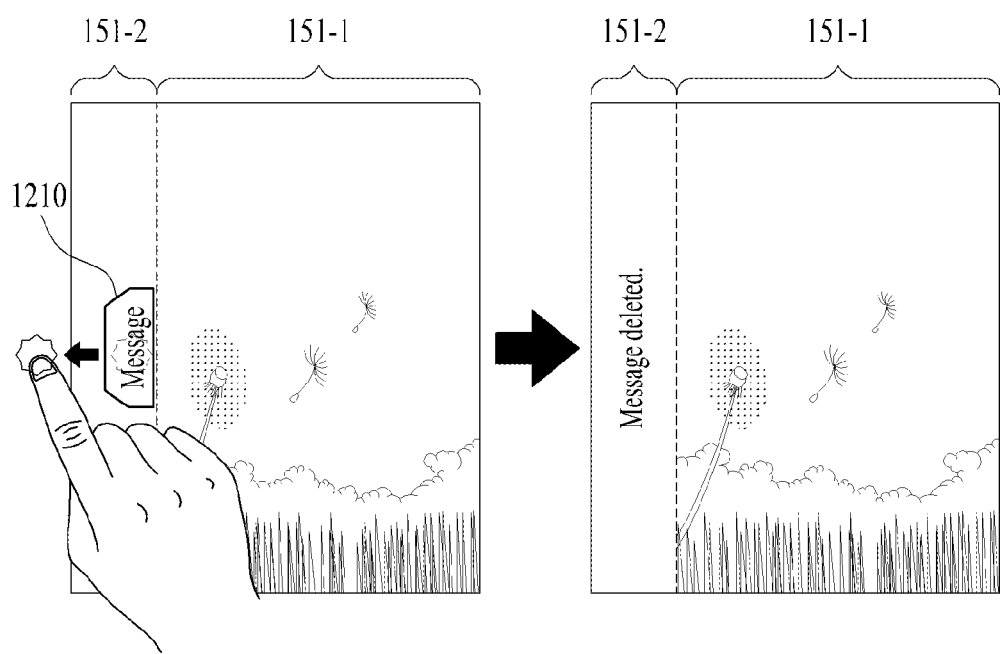

On the other hand, referring to FIG. 12E, if a pointer with which the notification tab 1210 is touched is dragged in a fourth direction opposite to the third direction, the controller 180 can control the received message to be deleted.

Like the examples shown in FIGS. 12B to 12E, the controller 180 can determine a method of processing an occurring event in accordance with a moving direction of a pointer with which the notification tab 1210 is touched. In order to guide a user of information indicating that a method of processing an occurring event can be changed in accordance with a moving direction of a pointer with which the notification tab 1210 is touched, referring to FIG. 12A, the controller 180 can control at least one of an arrow and a method of processing an event corresponding to a direction indicated by the arrow to be displayed around the notification tab 1210.

The relations between the moving direction of the pointer and the occurring event processing method according to the examples shown in FIGS. 12B to 12E are exemplarily provided to facilitate the description of the present invention, by which the present invention may be non-limited.

According to the descriptions with reference to FIGS. 8 to 12, a size of an event display region of a front output unit 151-1 is dependent on a size of a notification tab. Yet, it is not mandatory for the size of the event display region to be dependent on the size of the notification tab. The controller 180 can adjust the size of the event display region in response to a size or quantity of a detailed information on an event. Alternatively, the controller 180 can control the event display region to be displayed in accordance with a preset size and location. For another instance, the controller 180 can determine a size of the event display region in response to a user's touch input. For another instance, a size of the event display region can be determined in accordance with an output mode of the display unit 151. For further instance, the controller 180 can differently apply a method of determining a size of the event display region in accordance with the output mode of the display unit 151. How to determine a size of an event display region shall be described in detail with reference to FIGS. 13A to 13C as follows.

Figure 13A:
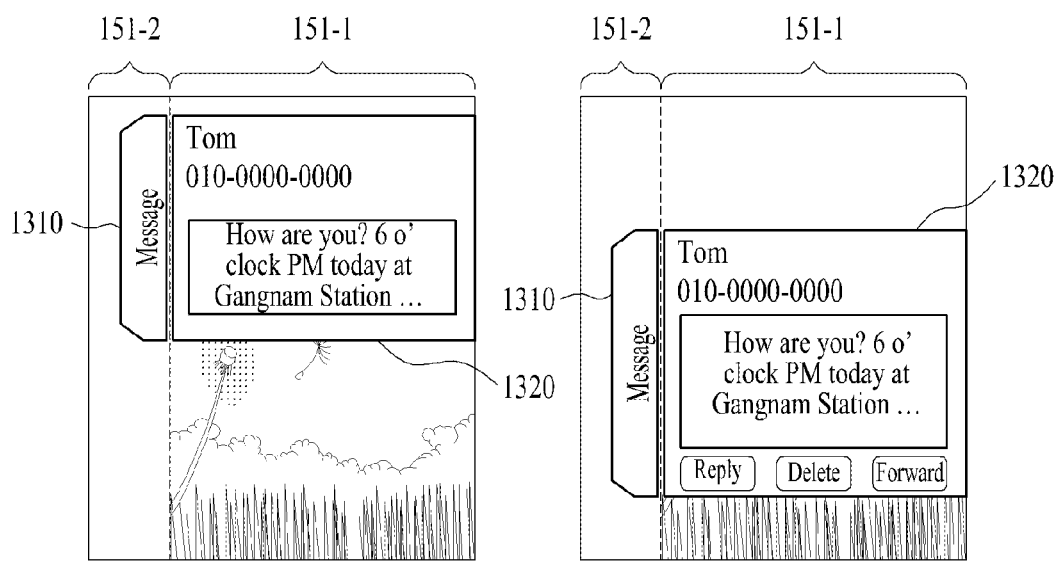
Figure 13B:
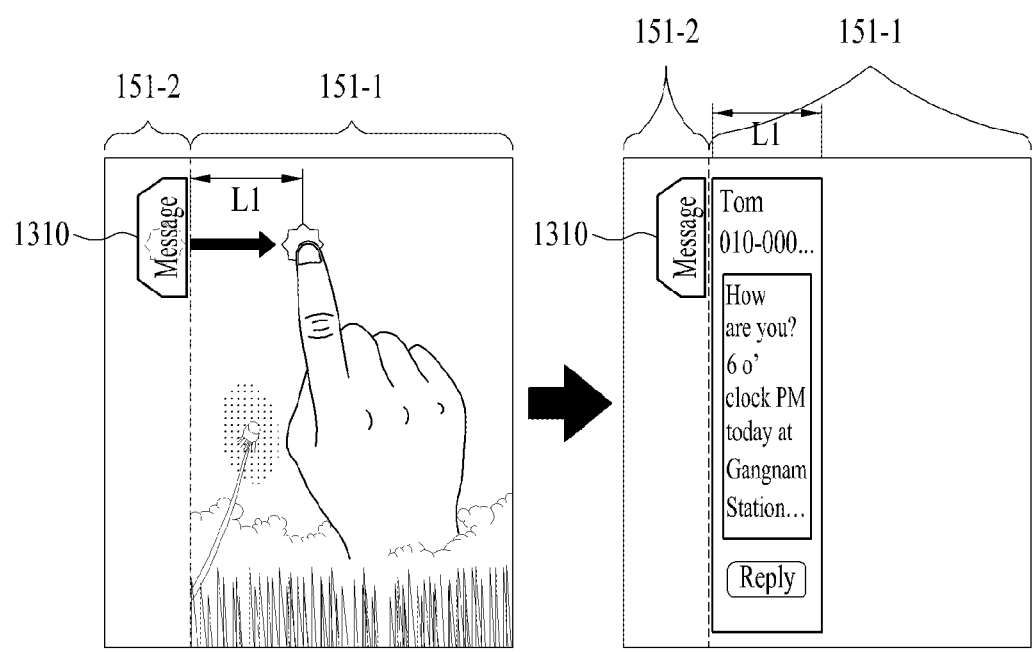

FIGS. 13A to 13C are diagrams for various examples related to a size of an event display region.

FIG. 13A is a diagram for one example of a case that a size and display region of an event display region 1320 are set depending on a size and display location of a notification tab 1310. Referring to FIG. 13A, the size and display region of an event display region 1320 can be adjusted depending on a size and display location of a notification tab 1310.

FIG. 13B is a diagram for one example of a case that a size of an event display region 1320 is determined in response to a user's touch input. Referring to FIG. 13B, if a first touch input includes an action performed in a manner of touching a notification tab 1310 and then dragging a pointer toward a front output unit 151-1, the controller 180 can set and event display region 1320 to a region ranging from a prescribed edge of the front output unit 151-1 to a pointer contact released point.

FIG. 13C is a diagram one example to describe that a method of determining a size of an event display region 1320 is differently applied in accordance with an output mode of the display unit 151. For instance, if the output mode of the display unit 151 is a portrait mode, like the example shown in FIG. 13A, the controller 180 can control the size of the event display region 1320 to be set depending on a size of the notification tab 1310. For another instance, if the output mode of the display unit 151 is a landscape mode, like the example shown in FIG. 13B, the controller 180 can control the size of the event display region 1320 to be determined in response to a user's touch input.

Besides, it is a matter of course that various methods of determining a size of an event display region can be apparently devised from the foregoing drawings despite not being illustrated in the corresponding drawings. For instance, a length of one of an event display region is determined depending on a notification, and a length of another side can be determined by a user's touch input.

In the examples shown in the forgoing drawings, a detailed information on a prescribed event can be displayed through at least one of a lateral output unit 151-2 and a front output unit 151-1. Moreover, by being non-limited by the foregoing drawings, the mobile terminal 100 according to the present invention can display detailed informations on a plurality of events at the same time. A process for displaying detailed informations of a plurality of events substantially at the same time shall be described with reference to the accompanying drawing as follows.

Figure 14:
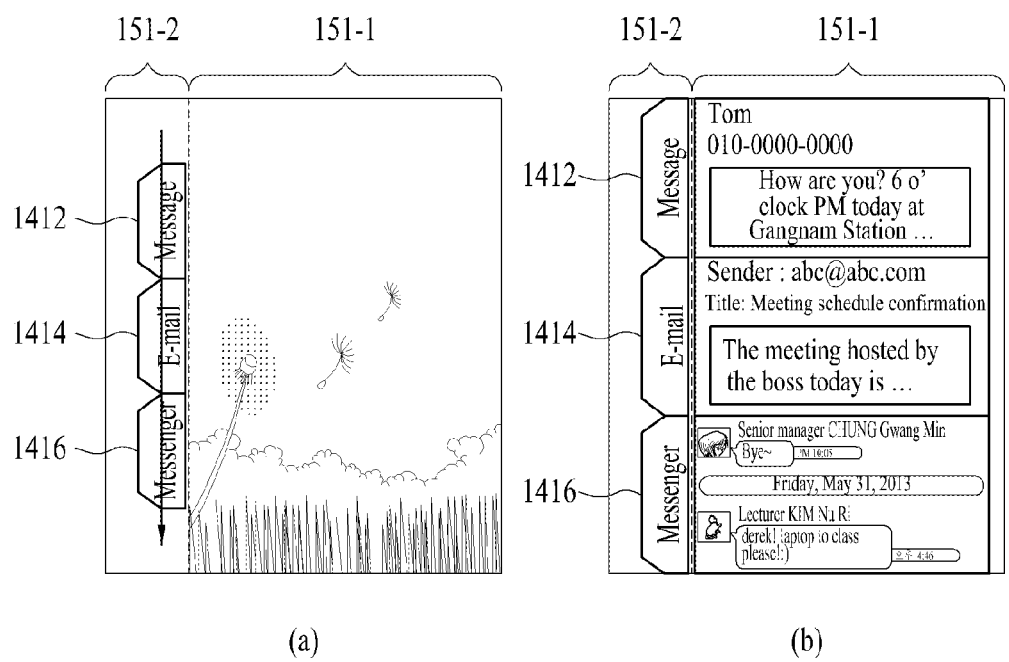
FIG. 14 is a diagram for one example to describe that detailed informations on a plurality of events corresponding to a plurality of notification tabs are displayed substantially at the same time.

FIG. 14 is a diagram for one example to describe that detailed informations on a plurality of events corresponding to a plurality of notification tabs are displayed substantially at the same time.

Referring to FIG. 14, if a pointer is dragged in a first direction along a trace (e.g., an arrow shown in FIG. 14(a) that traverses a plurality of notification tabs, the controller 180 can control detailed informations on a plurality of events, which correspond to a plurality of the notification tabs located on the pointer moving trace, respectively, to be displayed through at least one of a lateral output unit 151-2 and a front output unit 151-1.

For instance, if 3 notification tabs 1412, 1414 and 1416 are located on the pointer moving trace [FIG. 14(a)], the controller can control detailed informations on 3 events, which correspond to the 3 notification tabs 1412, 1414 and 1416, respectively, to be outputted.

In the example shown in FIG. 14, if the pointer is dragged in the first direction along the trace that traverses a plurality of the notification tabs, the detailed informations on a plurality of the events, which correspond to a plurality of the notification tabs 1412, 1414 and 1416, respectively, can be displayed substantially at the same time. A user input for displaying the detailed informations on a plurality of the events substantially at the same time in the example shown in FIG. 14 is provided for convenience of description only, by which the present invention may be non-limited. Aside from the user input mentioned in the description with reference to FIG. 14, at least one of an action of touching a prescribed notification tab and then dragging a pointer over a prescribed length, an action of touching a region free from displaying a notification tab in the lateral output unit 151-2 over prescribed duration, and an action of touching a region free from displaying a notification tab in the lateral output unit 151-2 consecutively multiple times can be set as the user input for displaying the detailed informations on a plurality of the events substantially at the same time. Moreover, while a detailed information on one event is displayed, if a first touch input for displaying a detailed information on another event is applied, detailed information on a plurality of events can be displayed substantially at the same time. Aside from the above-enumerated gestures, various types of gestures devisable by those skilled in the art can be set as the user input for displaying the detailed informations on a plurality of the events substantially at the same time.

As mentioned in the foregoing description, a detailed information on an event can be displayed through a lateral output unit 151-2 or a front output unit 151-1.

According to the present invention, the controller 180 can control a detailed information on an event to be selectively displayed on either a lateral output unit 151-2 or a front output unit 151-1 depending on appropriateness for the use of the front output unit 151-1 or the lateral output unit 151-2. This is described in detail with reference to FIG. 15A and FIG. 15B as follows.

Figure 15A:
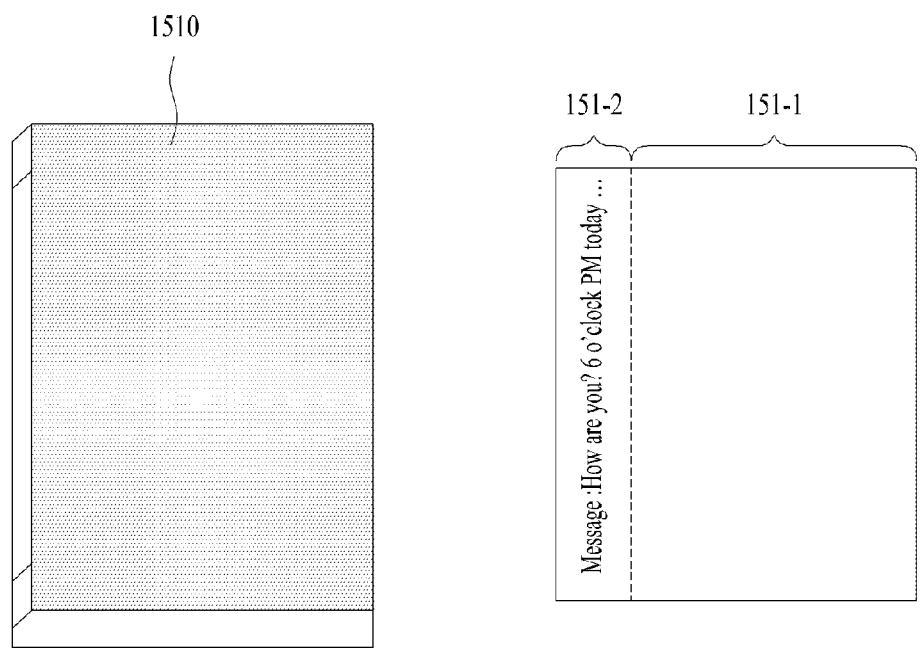
FIG. 15A and FIG. 15B are diagrams for one example to describe that a detailed information on an event is selectively displayed on either a lateral output unit or a front output unit.
Figure 15B:
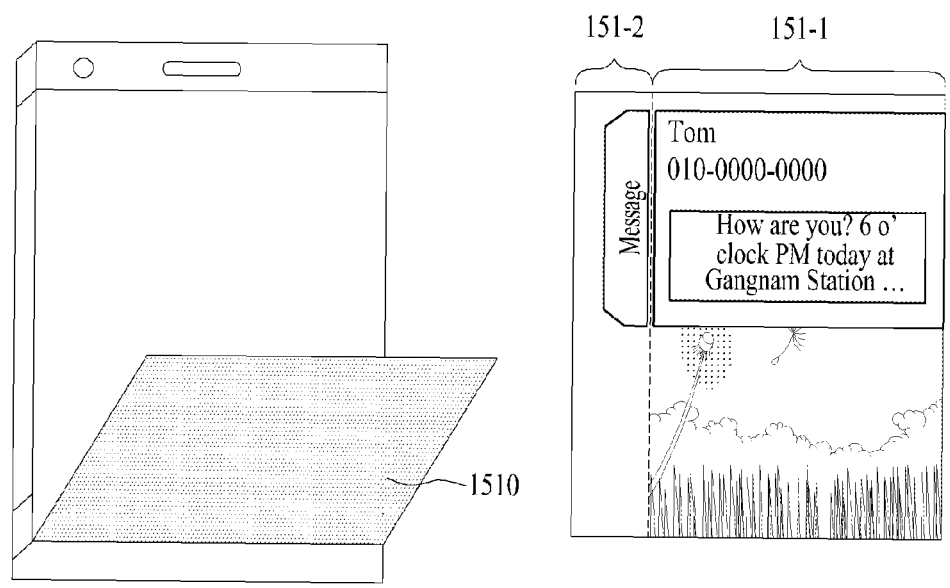

FIG. 15A and FIG. 15B are diagrams for one example to describe that a detailed information on an event is selectively displayed on either a lateral output unit or a front output unit. In general, in order to protect the display unit 151 from an external shock, it is able to use a protective cover 1510 configured to cover the display unit 151. While the protective cover 1510 applied to the mobile terminal 100 according to the present invention covers a front output unit 151-1, a lateral output unit 151-2 may be externally exposed. Hence, even if the protective cover 1510 currently covers the front output unit 151-1, the controller 180 can control information, which is to be delivered to a user, to be displayed through the lateral output unit 151-2. Generally, the controller 180 can determine whether the protective cover 1510 covers the front output unit 151-1 based on a sensing signal of the sensing unit 140.

Referring to FIG. 15A, if the protective cover 1510 covers the front output unit 151-1, the controller 180 can control a detailed information on an event to be outputted through the lateral output unit 151-2.

On the other hand, referring to FIG. 15B, as the protective cover 1510 is open, if the front output unit 151-1 is externally exposed, the controller 180 can control a detailed information on an event to be outputted through the front output unit 151-1.

While the detailed information on the event is currently outputted through the lateral output unit 151-2, if the protective cover 1510 is open, the controller 180 can control a display location of the detailed information on the event to be changed into the front output unit 151-1 from the lateral output unit 151-2. On the contrary, while the detailed information on the event is currently outputted through the front output unit 151-2, if the protective cover 1510 is closed, the controller 180 can control the display location of the detailed information on the event to be changed into the lateral output unit 151-2 from the front output unit 151-1.

Based on a remaining battery level, the controller 180 can determine a display position of an information on an event [not shown in the drawing]. For instance, if a remaining battery level is lower than a preset reference, the controller 180 controls the detailed information on the event to be displayed through the lateral output unit 151-2 having a size relatively smaller than that of the front output unit 151-1. If the remaining battery level is higher than the preset reference, the controller 180 can control the detailed information on the event to be outputted through the front output unit 151-1.

For another instance, based on a user input to a notification tab, the controller 180 can determine a display location of a detailed information on an event. This is described in detail with reference to FIG. 16 as follows.

Figure 16:
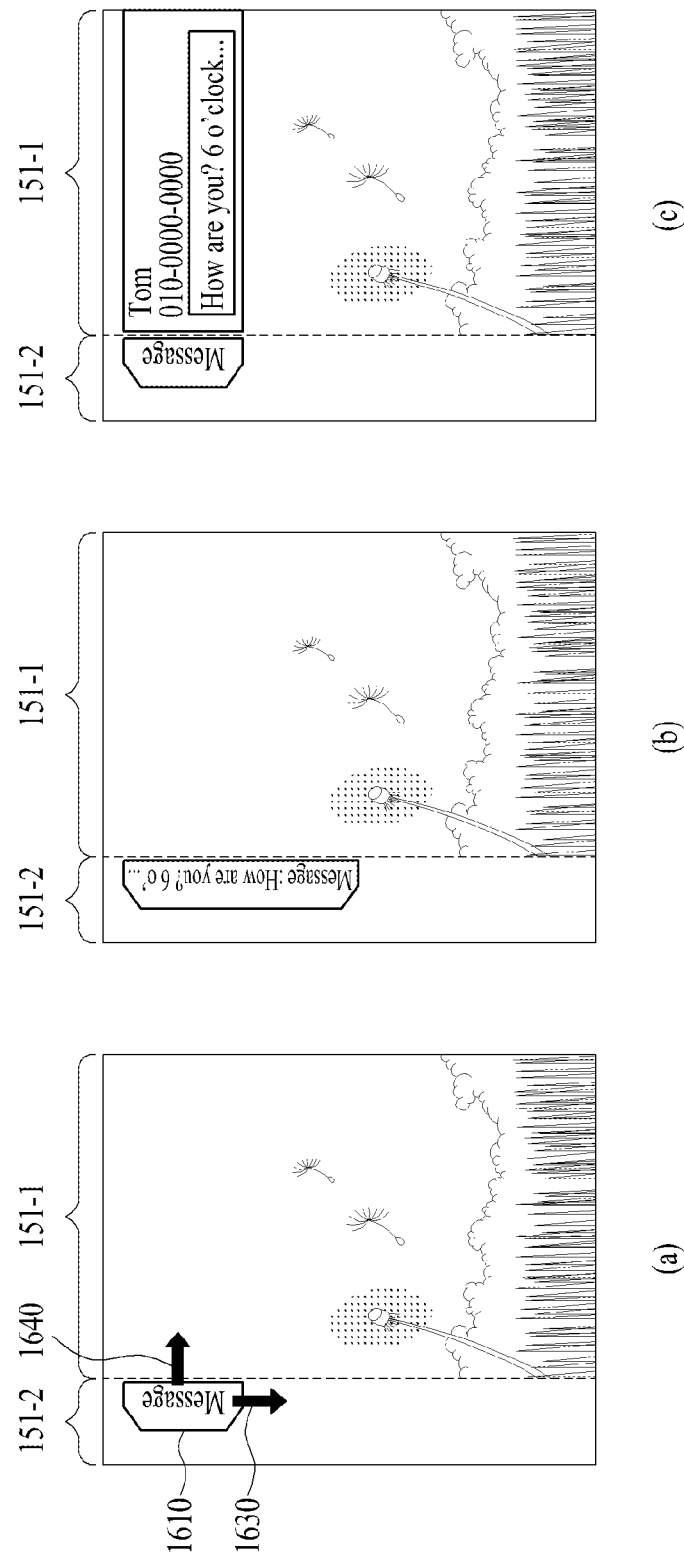
FIG. 16 is a diagram for one example to describe that a display location of a detailed information on an event is determined by a user input.

FIG. 16 is a diagram for one example to describe that a display location of a detailed information on an event is determined by a user input. For clarity of the following description, as shown in FIG. 16(*a*), assume that a single notification tab 1610 is currently displayed on a lateral output unit 151-2.

Referring to FIG. 16, the controller 180 can determine a display location of a detailed information on an event by discriminating a case of dragging a pointer with which the notification tab 1610 is touched in a first direction 1630 along the lateral output unit 151-2 and a case of dragging the pointer in a second direction 1640 toward a front output unit 151-1. In particular, for example, if the pointer with which the notification tab 1610 is touched is dragged in the first direction 1630 along the lateral output unit 151-2, referring to FIG. 16(*b*), the controller 180 can control the detailed information on the event to be displayed through the lateral output unit 151-2.

On the other hand, if the pointer with which the notification tab 1610 is touched is dragged in the second direction 1640 toward the front output unit 151-1, referring to FIG. 16(*c*), the controller 180 can control the detailed information on the event to be displayed through the front output unit 151-1.

In particular, like the example shown in FIG. 16, the controller 180 can control the detailed information on the event to be selectively displayed through one of the front output unit 151-1 and the lateral output unit 151-2 in accordance with a user's input to the notification tab 1610.

Meanwhile, the controller 180 can control a detailed information on an event to be displayed in lateral output unit mode or front output unit mode [not shown in the drawing].

If the detailed information on the event is displayed on a front output unit 151-1, the detailed information on the event blocks an information that started to be outputted through the front output unit 151-1 before displaying the detailed information on the event. Hence, the controller 180 can control an event display region, on which the detailed information on the event is displayed, to be outputted semi-transparently.

Yet, it is not everything to output the event display region semi-transparently. In case that the event display region is outputted semi-transparently, visibility of the detailed information on the event, which is outputted through the event display region, is degraded, it may cause inconvenience to a user. Hence, the controller 180 can determine whether to output an event display region semi-transparently depending on significance of an event. For instance, if an event display region displays a detailed information on an event having high significance, the controller controls the corresponding event display region to be displayed non-transparently. For another instance, if an event display region displays a detailed information on an event having low significance, the controller controls the corresponding event display region to be displayed semi-transparently.

The reference for determining high or low significance of an event can use a default setting value saved in a memory. For another instance, significance of an event can be determined depending on whether a counterpart having sent a message is an acquaintance or not. For example, like a case that a counterpart having sent a text message is registered at a phonebook, a case that a counterpart having sent an instant message is set on the instant message as a friend with a user of the mobile terminal 100, a case that an email account address of a counterpart having sent an email is already registered, or the like, if a counterpart having sent a message is an acquaintance, significance of a corresponding event can be determined as high. Otherwise, significance of the corresponding event can be determined as low.

The mobile terminal 100 according to the present invention can display an icon, which is linked to an information blocked by an event display region, on a lateral output unit 151-2.

Figure 17:
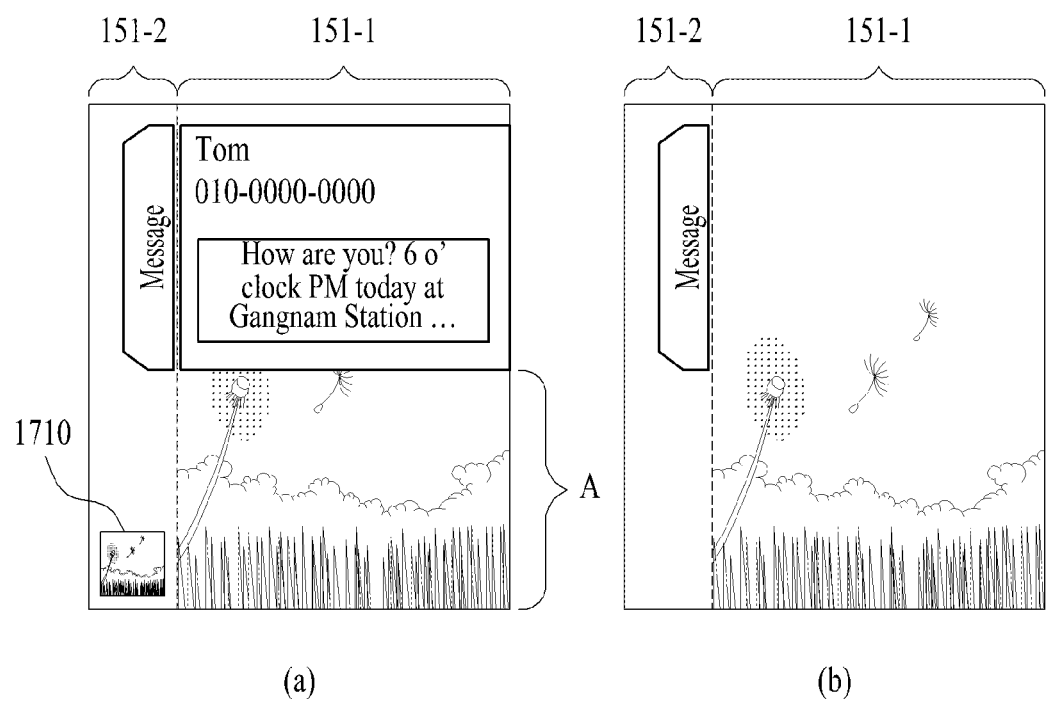
FIG. 17 is a diagram for one example to describe that an icon linked to an information blocked by an event display region is displayed through a lateral display unit.

FIG. 17 is a diagram for one example to describe that an icon linked to an information blocked by an event display region is displayed through a lateral display unit.

Referring to FIG. 17, if a detailed information on an event is outputted through an event display region of a front output unit 151-1, the controller 180 can control an icon, which is linked to an information blocked by the event display region, to be displayed through a lateral output unit 151-2 [FIG. 17(*a*)]. If the icon 1710 displayed through the lateral output unit 151-2 is touched, the controller 180 can control the information blocked by the event display region to be displayed on a front side of the front display unit 151 [FIG. 17(*b*)]. Hence, a user can watch the information blocked by the event display region at any time. Aside from touching the icon 1710 displayed on the lateral output unit 151-2, the information blocked by the event display region may be displayed on the front side by touching a region [e.g., a region indicated by a reference notation 'A' shown in FIG. 17(*a*)] not blocked by the event display region in the front output unit 151-1.

The blocked information linked icon 1710 may be outputted from the lateral output unit 151-2 only if the information blocked by the event display region has a rate equal to or greater than a predetermined rate of overall.

For another example, while a detailed information on an event is displayed, the mobile terminal 100 according to the present invention can control an information, which started to be outputted through a front output unit 151-1 before the detailed information on the event is displayed, to be displayed by being reduced. This is described in detail with reference to FIG. 18 as follows.

Figure 18:
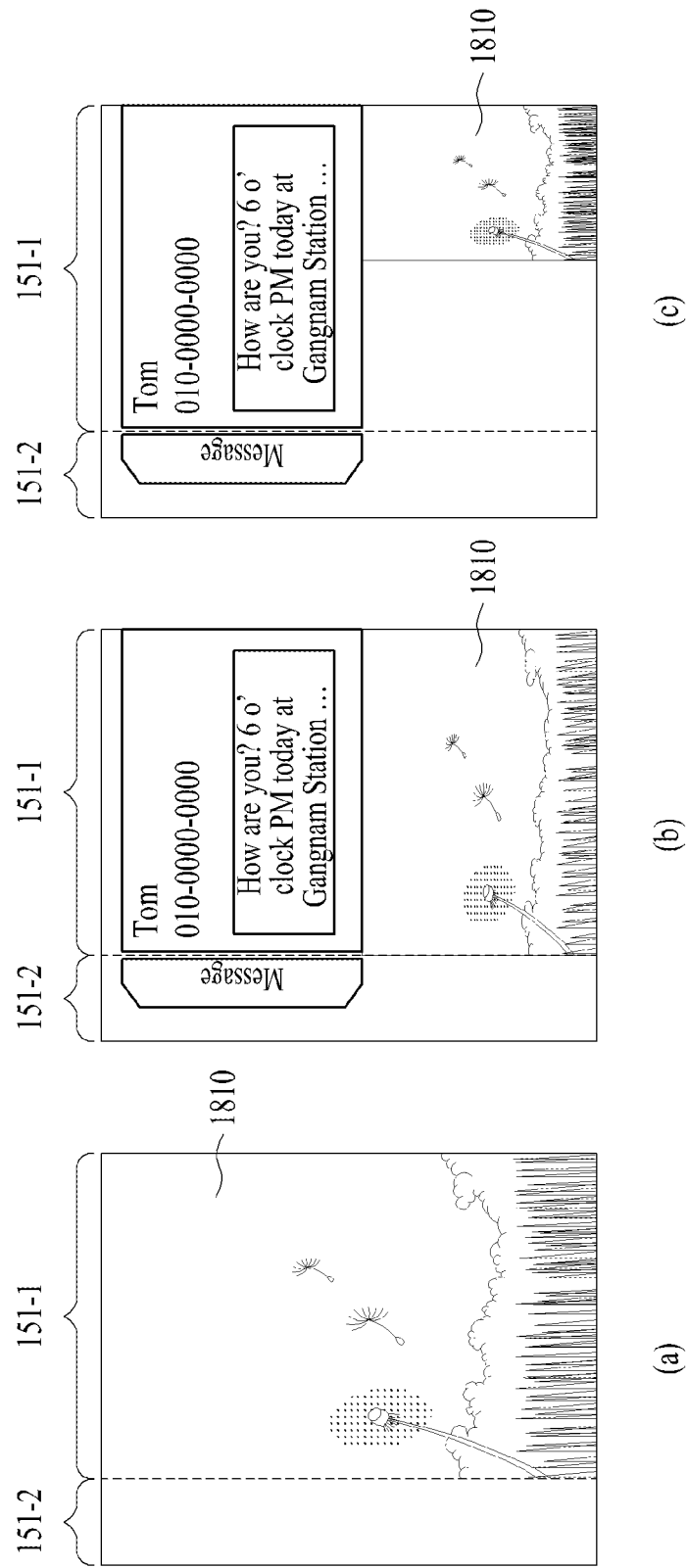
FIG. 18 is a diagram for one example to describe that an information outputted through a front output unit is displayed by being reduced.

FIG. 18 is a diagram for one example to describe that an information outputted through a front output unit is displayed by being reduced. For clarity of the following description, assume that an information outputted through a front output unit 151-1 is an image.

FIG. 18(*a*) is a diagram for one example of an output status of a front output unit 151-1 before a detailed information on an event is displayed on the front output unit 151-1. In the example shown in FIG. 18(*a*), an image 1810 is currently outputted through the front output unit 151-1. If the detailed information on the event is displayed through an event display region of the front output unit 151-1, referring to FIG. 18(*b*) and FIG. 18(*c*), the controller 180 can control the image 1810, which started to be outputted through the front output unit 151-1 before the detailed information on the event is displayed, to be displayed by being reduced. In displaying the reduced image 1810, the image 1810 can be reduced in a manner of ignoring an original horizontal-vertical ratio [FIG. 18(*b*)] or maintaining the original horizontal-vertical ratio [FIG. 18(*c*)].

Aside from the case of outputting the image through the front output unit 151-1, in case that information on a video, a webpage, a home screen or the like is outputted through the front output unit 151-1, it is a matter of course that the above-described embodiments can be applied thereto.

Referring now to FIG. 5, if the controller 180 determines that the user has completed the confirmation of the detailed information on the event [S505], the controller 180 can control the display of the detailed information on the event to be ended [S506]. In particular, the controller 180 can control the display of the notification tab, which is displayed through the lateral display unit 151-2, to be ended as well as the display of the detailed information on the event.

If a prescribed touch input (hereinafter named a second touch input) notifying that the detailed information on the event has been confirmed is applied to at least one of the notification tab and the event display region or a user's touch input for processing the occurring event is inputted [cf. FIGS. 9 to 12], the controller 180 can determine that the user has completed the confirmation of the detailed information on the event.

In this case, the second touch input can be configured with at least one of an action of touching a notification tab or an event display region, an action of touching a notification tab or an event display region over prescribed duration, an action of consecutively touching a notification tab or an event display region at least N times, an action of touching one end portion of a notification tab and then dragging a pointer inside the notification tab, an action of touching an event display region and then dragging a pointer in a prescribed direction, an action of dragging a pointer in a second direction along a trace of traversing a notification tab, and the like. Aside from the above-enumerated gestures, it is a matter of course that gestures of various types easily devisable by those skilled in the art can be set as the second touch input.

An embodiment for ending a display of a detailed information on an event shall be described in detail with reference to the accompanying drawings as follows.

Figure 19:
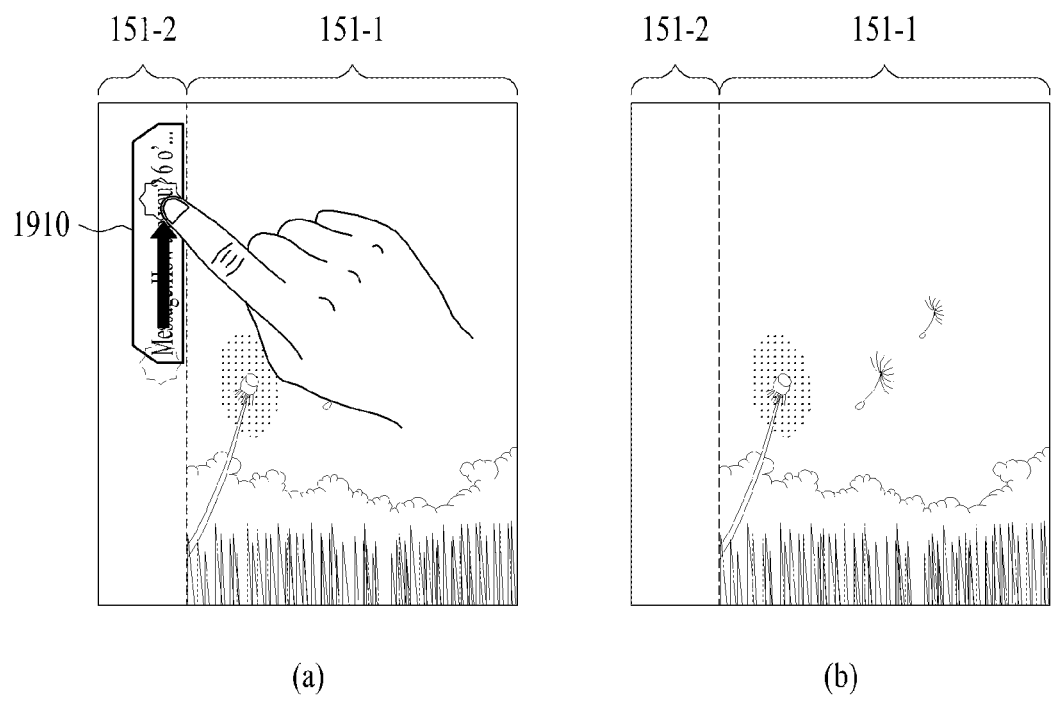
FIG. 19 and FIG. 20 are diagrams for one example to describe that a display of a detailed information on an event is ended.
Figure 20:
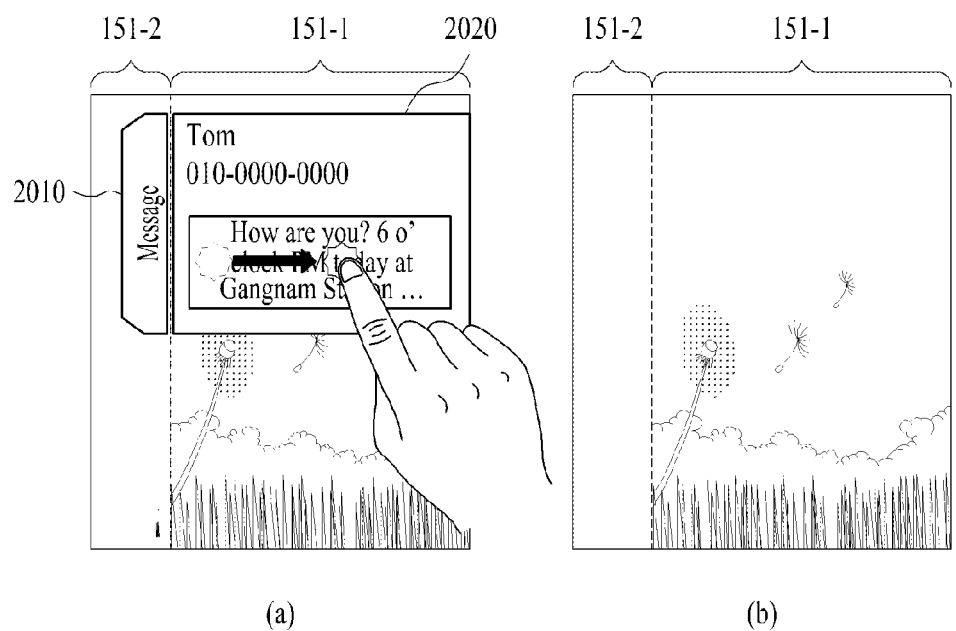

FIG. 19 and FIG. 20 are diagrams for one example to describe that a display of a detailed information on an event is ended. In particular, FIG. 19 is a diagram for one example of displaying a detailed information on an event through a lateral output unit 151-2. And, FIG. 20 is a diagram for one example of displaying a detailed information on an event through a front output unit 151-1.

Referring to FIG. 19, if a second input (e.g., an action of touching one end portion of a notification tab 1910 and then dragging a pointer inside the notification tab 1910) is applied to the notification tab 1910 indicating a detailed information on an event [FIG. 19(a)], the controller 180 can control the notification tab 1910 to stop being displayed on a lateral output unit [FIG. 19(b)].

For another instance, referring to FIG. 20, if a second input (e.g., an action of touching an event display region and then dragging a pointer in a prescribed direction) is applied to the event display region [FIG. 20(a)], the controller 180 can control the event display region to stop being displayed, thereby controlling a detailed information on an event to stop being displayed [FIG. 20(b)]. In doing so, the controller 180 can control a notification 2010 to stop being displayed on a lateral output unit 151-2 as well.

Moreover, if a user's touch input for processing an occurring event is applied (cf. FIGS. 9 to 12), an event display region and a notification tab may stop being displayed [not shown in the drawing].

Furthermore, when detailed informations on a plurality of events are displayed substantially at the same time, if a pointer is dragged in a second direction along a trace that traverses a plurality of notification tabs, the controller 180 can control the detailed informations on a plurality of the events, which correspond to a plurality of the notification tabs located on a pointer moving trace, respectively, to stop being outputted substantially at the same time.

For clarity of the former descriptions with reference to the above drawings, the display unit 151 is assumed as including a single lateral output unit. The mobile terminal 100 according to the present invention can include two lateral output units (hereinafter named a first lateral output unit and a second lateral output unit, respectively) provided to both sides of a front output unit, respectively.

In this case, a notification tab can be displayed through one of the two lateral output units only. For instance, the controller 180 can control the notification tab to be displayed on one of the first lateral output unit and the second lateral output unit based on a default setting value.

For another instance, the controller 180 can control the notification tab to be displayed on one of the first lateral output unit and the second lateral output unit based on which hand is used to grip the mobile terminal 100 by a user. In particular, if the controller 180 determines that the user grips the mobile terminal 100 with a left hand, the controller 180 can control the notification tab to be displayed through the lateral output unit provided to a left side of the mobile terminal 100 (or the lateral output unit provided to a right side of the mobile terminal 100). On the other hand, if the controller 180 determines that the user grips the mobile terminal 100 with a right hand, the controller 180 can control the notification tab to be displayed through the lateral output unit provided to the right side of the mobile terminal 100 (or the lateral output unit provided to the left side of the mobile terminal 100). In more particular, the controller 180 can control the notification tab to be displayed through the lateral output unit located in the same direction of the hand with which the mobile terminal 100 is gripped by the user. In doing so, the controller 180 can determine that which one of the left side and the right side of the mobile terminal 100 is gripped by the user based on a sensing signal of the sensing unit 140.

The mobile terminal 100 according to the present invention controls the notification tab to be displayed through the first lateral output unit and is also able to control a detailed information on an event corresponding to the notification tab to be displayed through the second output unit.

Besides, a notification tab can be displayed on each of the first lateral output unit and the second lateral output unit. For instance, the controller 180 initially outputs a notification tab through the first lateral output unit. In doing so, if a space for displaying the notification tab gets insufficient, the controller 180 can control the notification tab to be displayed through the second lateral output unit. For another instance, the controller 180 can control a notification tab to be alternately displayed on the first lateral output unit and the second lateral output unit. Alternatively, each time a single event occurs, the controller can control a notification tab to be displayed on each of the first lateral output unit and the second lateral output unit.

The mobile terminal 100 according to the present invention can use a lateral output unit 151-2 to notify the multitasking currently performed in a multitasking environment. This is described in detail with reference to FIG. 21A and FIG. 21B as follows.

Figure 21A:
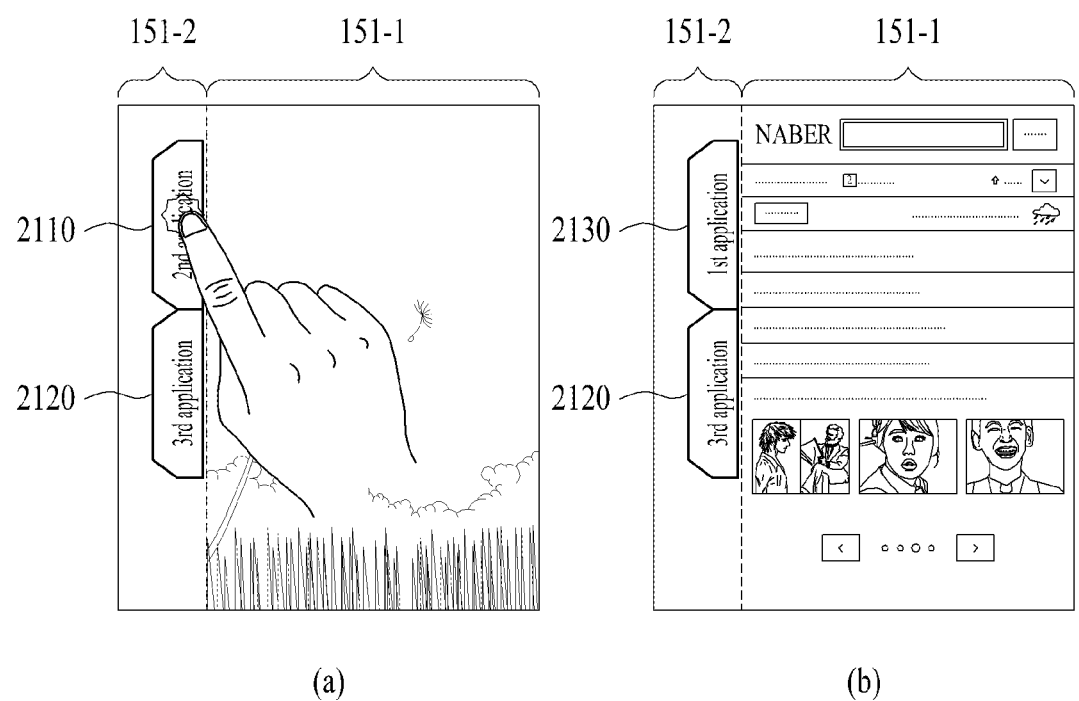
FIG. 21A and FIG. 21B are diagrams for one example of a lateral output unit and a front output unit in a multitasking environment.
Figure 21B:
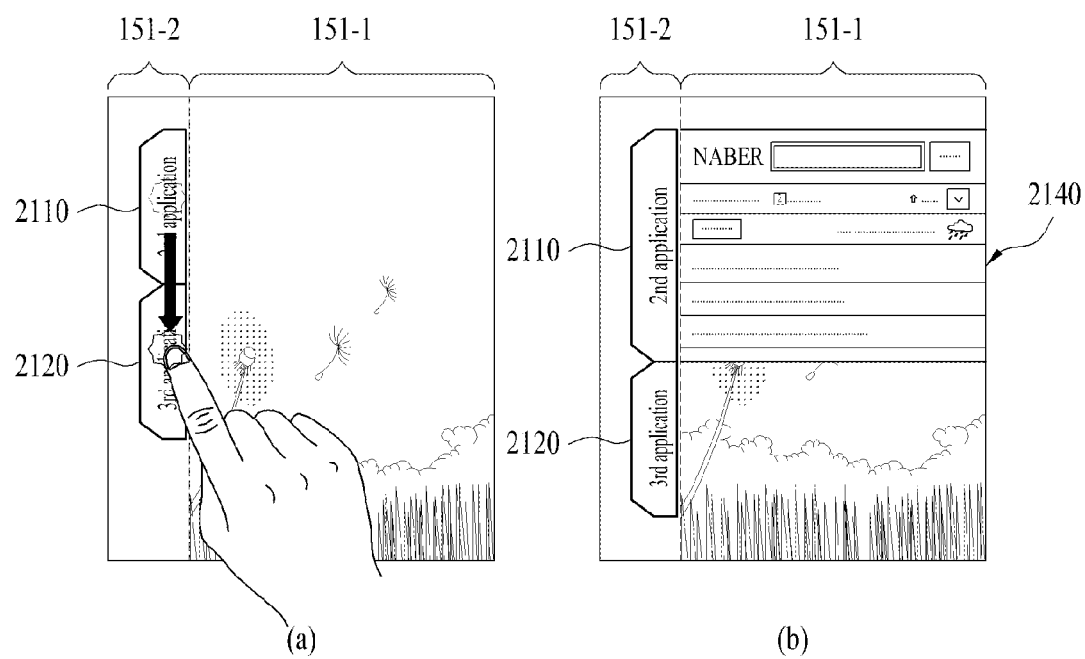

FIG. 21A and FIG. 21B are diagrams for one example of a lateral output unit and a front output unit in a multitasking environment. For clarity of the following description, assume that 3 applications (hereinafter named first to third applications) are currently active in the mobile terminal 100. Assume that the first application is active in a foreground state. And, assume that each of the second application and the third application is active in a background state.

First of all, referring to FIG. 21A (a) and FIG. 21B (a), the controller 180 controls the first application active in the foreground state to be outputted through a front output unit 151-1 and can control objects 2110 and 2120 (e.g., objects of tab type in FIG. 21) (hereinafter named application tabs), which indicate applications active in the background state) to be displayed through a lateral output unit 151-2. In doing so, the controller 180 can change an application, which is to enter the foreground state, based on a user input to the corresponding application tab. And, the controller 180 can control a plurality of applications to be simultaneously activated in the foreground state based on a user input to the corresponding application tab.

For instance, referring to FIG. 21A (a), if the second application tab 2110 displayed through the lateral output unit 151-2 is touched, the controller 180 controls the second application indicated by the second application tab 2110 to enter the foreground state and also controls the first application previously activated in the foreground state to enter the background state. As the first application enters the background state, a first application tab 2130 can be newly displayed on the lateral output unit 151-2.

For another instance, if a prescribed user input (e.g., an action of touching the second application tab 2110 and then dragging a pointer in a prescribed direction, an action of dragging the second application tab 2110 in a prescribed direction, etc.) is applied to the second application tab 2110 displayed through the lateral output unit 151-2 [FIG. 21B (a)], the controller 180 sets at least one portion of the front output unit 151-1 as an additional task display region 2140 for outputting a second application and is then able to control the second application to be outputted through the additional task display region 2140 [FIG. 21B (b)]. Hence, the second application is outputted through the additional task display region 2130 and the first application is outputted through a region other than the additional task display region 2140, whereby a plurality of applications can be activated in the foreground state. In this case, a size and location of the additional task display region 2140 may be dependent on those of the application tab 2110 like the foregoing event display region.

Generally, a status display line for displaying an operating status of the mobile terminal 100 is displayed on the display unit 151. For instance, FIG. 22A is a diagram for one example of displaying a status display line.

Figure 22A:
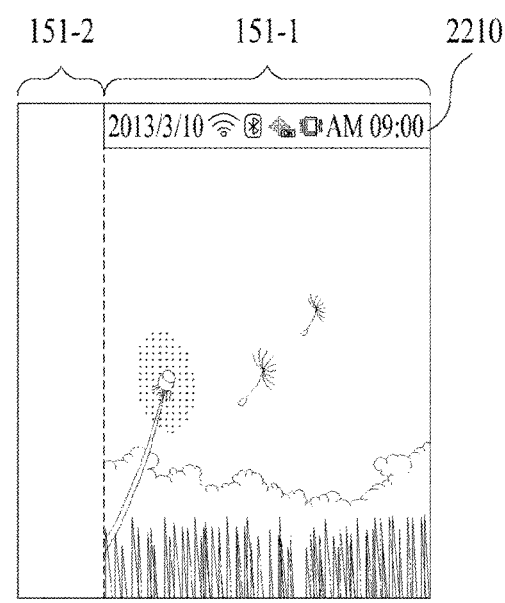
FIG. 22A is a diagram for one example of displaying a status display line.

Referring to FIG. 22A, the controller 180 can control a status display line 2210, which indicates an operating status of the mobile terminal 100, to be displayed on one end portion (e.g., a top side of a front output unit, etc.) of the display unit 151. In this case, such information related to operations of the mobile terminal 100 as an active state of a wireless communication module (e.g., W-Fi module, Bluetooth module, GPS module, etc.), an information indicating whether a mode of the mobile terminal 100 is set to a vibration mode, a remaining battery level and the like can be displayed on the status display line.

The mobile terminal 100 according to the present invention omits the status display line 2210 from a front output unit 151-1 but is able to control an object (e.g., an icon, an indicator, etc.) indicating an operating status of the mobile terminal to be displayed through a lateral output unit 151-2 by replacing the status display line.

Figure 22B:
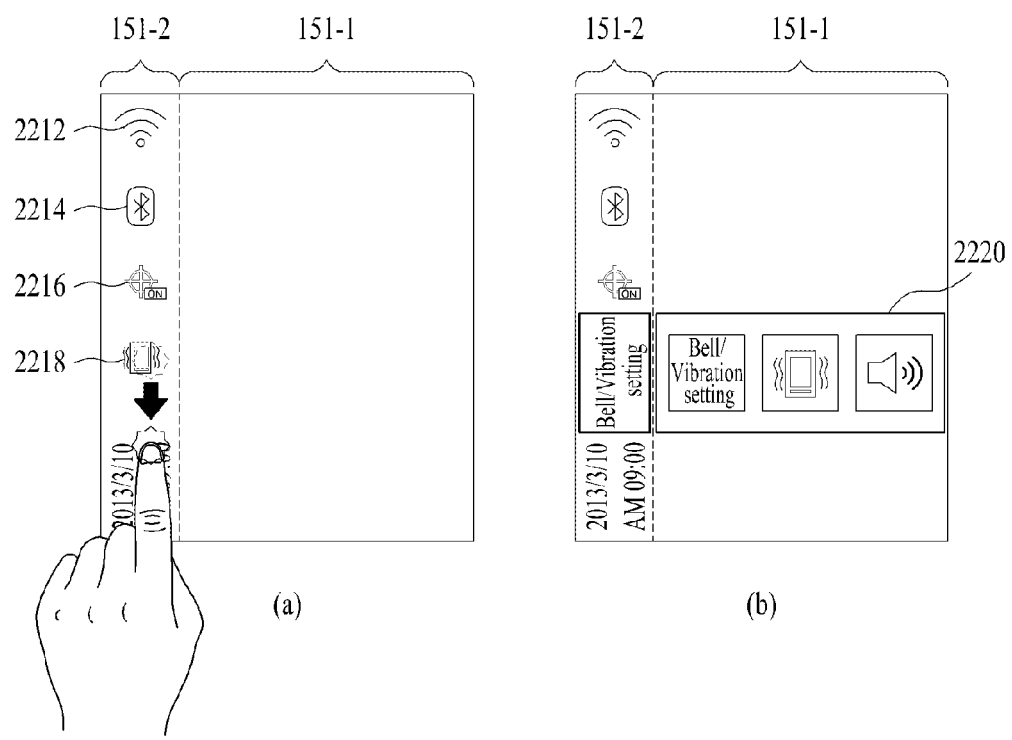
FIG. 22B is a diagram for one example of displaying an object indicating an operating status of a mobile terminal through a lateral output unit.

For instance, FIG. 22B is a diagram for one example that an object indicating an operating status of a mobile terminal is displayed through a lateral output unit. Referring to FIG. 22B, the controller 180 can control objects 2212, 2214, 2216 and 2218 to be displayed through a lateral output unit 151-2 to indicate operating statuses of the mobile terminal 100. Moreover, the controller 180 controls the foregoing status display line 2210 to stop being displayed through a front output unit 151-1, thereby enabling a user to use the front output unit 151-1 widely.

If a user input (e.g., an action of touching the object, an action of touching the object and dragging a pointer in a prescribed direction, an action of touching the object and dragging the touched object in a prescribed direction, etc.) is applied to the object displayed through the lateral output unit 151-2, the controller 180 can control a menu, which is provided to adjust an operation of the mobile terminal in association with the selected object, to be displayed through the front output unit 151-1. For instance, if an appropriate user input is applied to the object 2218 indicating that a mode of the mobile terminal 100 is set to a vibration mode [FIG. 22B (a)], the controller 180 can control a menu 2220, which is provided to enable/disable the vibration mode of the mobile terminal 100, to be displayed [FIG. 22B (b)]. For instance, if an appropriate user input is applied to the object 2212 indicating an active state of a menu for adjusting whether to activate the Wi-Fi module can be displayed [not shown in the drawing]. For another instance, if an appropriate user input is applied to the object 2214 indicating an active state of Bluetooth, a menu for adjusting whether to activate the Bluetooth module can be displayed [not shown in the drawing]. For further instance, if an appropriate user input is applied to the object 2216 indicating an active state of GPS, a menu for adjusting whether to activate the GPS module can be displayed [not shown in the drawing].

On the other hand, if an object indicating an operating status of the mobile terminal 100 is touched, the controller 180 can control an operation of the mobile terminal 100 to be switched directly [e.g., if the W-Fi object is touched, an active state of W-Fi is directly adjusted without displaying a corresponding menu].

According to the present invention, it is able to unlock the mobile terminal 100 through the front output unit 151-1 and the lateral output unit 151-2 of the mobile terminal 100. A method of unlocking the mobile terminal 100 through the front output unit 151-1 and the lateral output unit 151-2 shall be described in detail with reference to the accompanying drawings as follows.

First of all, the display unit 151 of the touchscreen type is generally applied to the mobile terminal 100. Hence, if an inactive state of the mobile terminal 100 is switched to an active state (e.g., a case that the mobile terminal 100 gets away from a sleep mode, a case that a power of the mobile terminal 100 is turned on, etc.), in order to prevent a user from making a mistake of an unintended incorrect input, the display unit 151 can be set to enter a locked state. While the display unit 151 is set in the locked mode, all of the received touch inputs are not effective. In particular, while the display unit 151 is set in the locked state, the controller 180 determines a specifically regulated touch action as a meaningful user command but may also determine that other touch actions are not meaningful user commands.

For instance, while the displayed unit 151 is in the locked state, the controller 180 may determine that a touch input applied through the lateral output unit 151-2 is a meaningful user command but may also determine that a touch input applied through the front output unit 151-1 is not a meaningful user command. For another instance, when there are two lateral output units 151-2, the controller 180 may determine that a touch input applied through one of the two lateral output units 151-2 is a meaningful user command but may also determine that a touch input applied through the other is not a meaningful user command. Besides, the controller 180 may determine that a touch input to an object (e.g., an icon, an indicator, a tab, etc.) displayed through at least one of the front output unit 151-1 and the lateral output unit 151-2 is a meaningful user input.

In the following description, a method of unlocking a mobile terminal 100 according to the present invention is explained in detail with reference to the accompanying drawing as follows.

FIG. 23 is a flowchart for an unlocking method of a mobile terminal according to one embodiment of the present invention. In particular, FIG. 23(a) is a flowchart for operation to describe a process for setting an unlock pattern. And, FIG. 23(b) is a flowchart for operation to describe a process for unlocking a mobile terminal 100 for which the unlock pattern is set.

Referring to FIG. 23, if the controller 180 receives a user input for setting an unlock pattern to use to unlock the display unit 151 [S2301a], the controller 180 can determine whether a preset unlock pattern exists [S2302a]. If the preset unlock pattern exists, the controller 180 receives a touch input matching the preset unlock pattern [S2303a] and is then able to set a new unlock pattern [S2304a]. If the preset unlock pattern does not exist, the controller 180 can set an unlock pattern without receiving a touch input matching a preset unlock pattern [S2304a].

In this case, the user input for setting the unlock pattern may include at least one of an action for a user to squeezing the mobile terminal 100 plural times as many as a preset count, an action of touching a menu icon for setting the unlock pattern, an action of inputting a touch having a preset pattern to at least one of the front output unit 151-1 and the lateral output unit 151-2.

On the contrary, while the mobile terminal 100 enters an active state, if a user input of selecting an end button or a user input of squeezing the mobile terminal 100 plural times as many as a preset count is applied, the controller 180 can control the mobile terminal 100 to enter an inactive state again.

In doing so, the controller 180 can determine whether the user has squeezed the mobile terminal 100 based on a sensing signal of the sensing unit 140. For instance, the controller 180 can determine whether the mobile terminal 100 is squeezed using a touch sensor or depressurization sensor provided to a lateral side of the mobile terminal 100.

When the touch sensor is used, in one of cases of: i) detecting at least two preset pointers from a lateral output unit 151-2 on one prescribed side; ii) detecting at least two preset pointers from a lateral output unit 151-2 on one prescribed side and also detecting at least one pointer from a lateral output unit 151-2 on the other side; iii) detecting at least two preset pointers from a lateral output unit 151-2 on one prescribed side and also detecting at least one pointer touching a prescribed area from a lateral output unit 151-2 on the other side; and the like, the controller 180 can determine that the mobile terminal 100 is squeezed. This is described in detail with reference to FIGS. 24A to 24D as follows.

FIGS. 24A to 24D are diagrams for one example to describe a method of determining whether a mobile terminal is squeezed using a touch sensor. In FIGS. 24A to 24D, a left diagram shows one example of a configuration for a user to grip the mobile terminal 100. And, a right diagram shows one example of a pointer (i.e., finger) detected point on the display unit 151 when the mobile terminal 100 is gripped in the configuration shown in the left drawing. In FIGS. 24A to 24D, the front output unit 151-1 and the lateral output unit 151-2 are discriminated from each other using a dotted line.

Figure 24A:
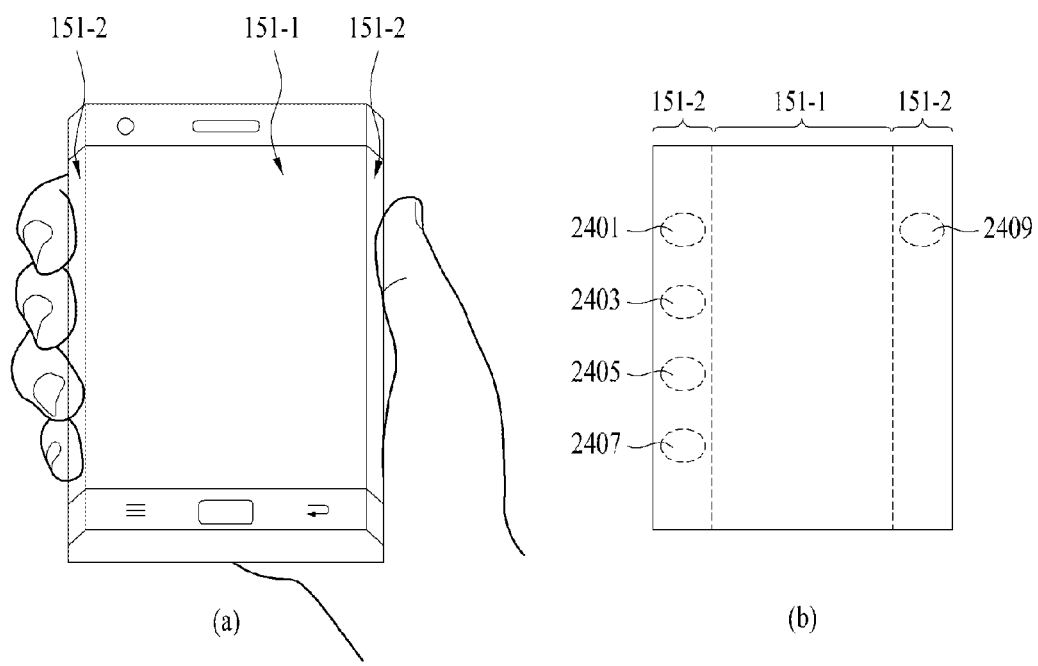
FIGS. 24A to 24D are diagrams for one example to describe a method of determining whether a mobile terminal is squeezed using a touch sensor.
Figure 24B:
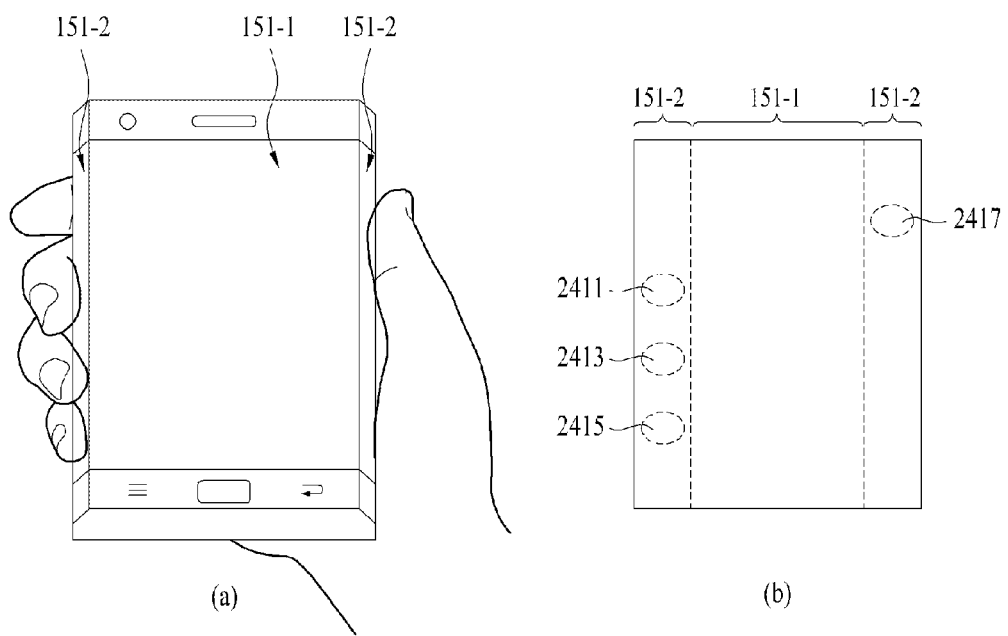

Referring to FIG. 24A, a user can grip the mobile terminal 100 in a manner of touching a right lateral output unit 151-2 with 1 finger of a hand [2409] and also touching a left lateral output unit 151-2 with 4 fingers of the hand [2401, 2403, 2405, 2407]. Referring to FIG. 24B, a user can grip the mobile terminal 100 in a manner of touching a right lateral output unit 151-2 with 1 finger of a hand [2417] and also touching a left lateral output unit 151-2 with 3 fingers of the hand [2411, 2413, 2415].

Figure 24C:
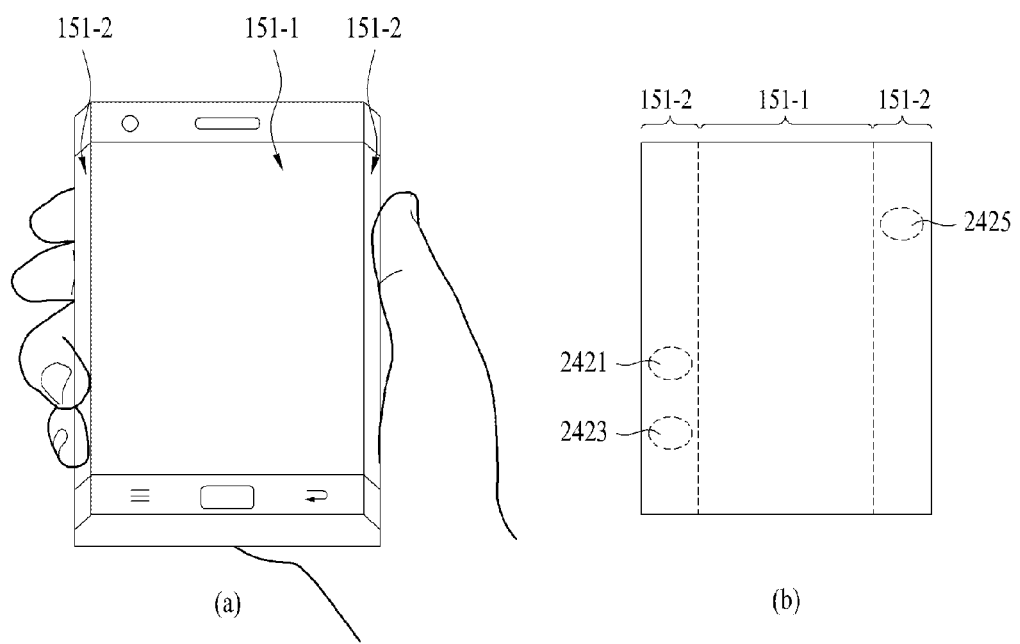
Figure 24D:
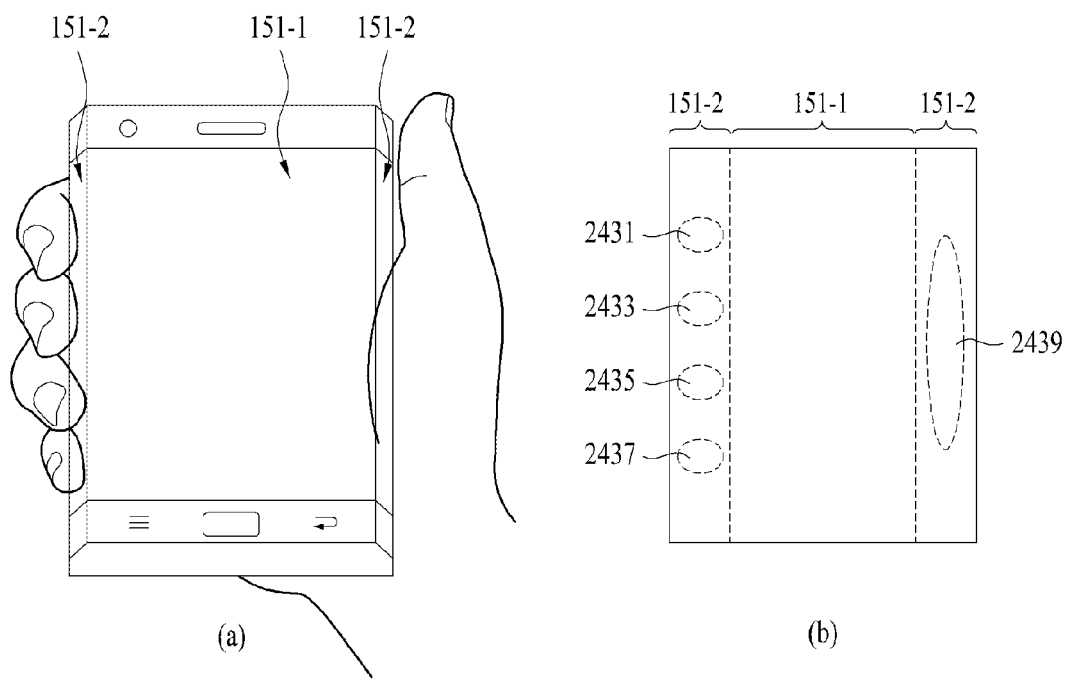

Referring to FIG. 24C, a user can grip the mobile terminal 100 in a manner of touching a right lateral output unit 151-2 with 1 finger of a hand [2425] and also touching a left lateral output unit 151-2 with 2 fingers of the hand [2421, 2423]. Referring to FIG. 24D, a user can grip the mobile terminal 100 in a manner of touching a right lateral output unit 151-2 with a palm of a hand [2439] and also touching a left lateral output unit 151-2 with a plurality of fingers (e.g., 4 fingers in FIG. 24D) of the hand [2431, 2433, 2435, 2437].

Like the examples shown in FIGS. 24A to 24D, when the user grips the mobile terminal, a plurality of pointers can be detected through the lateral output unit 151-2 of at least one side of the mobile terminal 100. Hence, the controller 180 can determine whether the mobile terminal 100 is squeezed based on such information as the number or contact size of the pointers detected through the lateral output unit 151-2 of one side in addition to the number of pointers detected through the lateral output unit 151-2 of the other side.

For instance, if a condition for determining that the mobile terminal 100 is squeezed is a detection of at least 4 pointers through the lateral output unit 151-2 of one side, when the mobile terminal 100 is gripped in one of the configurations shown in FIGS. 24A to 24D, the controller 180 may determine that the mobile terminal 100 is squeezed. For another instance, if a condition for determining that the mobile terminal 100 is squeezed includes a detection of at least 4 pointers through the lateral output unit 151-2 of one side and a detection of a pointer having a large contact area through the lateral output unit 151-2 of the other side, when the mobile terminal 100 is gripped in the configuration shown in FIG. 24D, the controller 180 may determine that the mobile terminal 100 is squeezed.

Thus, the controller 180 compares the sensing signal generated from the touch sensor to at least one of i) the number of pointers detected through the lateral output unit 151-2 of one side, ii) the number of pointers detected through the lateral output unit 151-2 of the other side, and iii) a touch area in the lateral output unit 151-2, thereby being able to determine whether the mobile terminal 100 is squeezed.

For another instance, using a sensing signal generated by the depressurization sensor, the controller 180 can determine whether the mobile terminal 100 is squeezed based on a force of a pressure applied to the lateral side of the mobile terminal 100. In particular, if the controller 180 determines that a pressure equal to or greater than a threshold is applied to the lateral side of the mobile terminal, the controller 180 can determine that the mobile terminal 100 is squeezed.

The depressurization sensor for measuring a pressure may be provided to each of both of the lateral sides of the mobile terminal 100 or to one prescribed lateral side of the mobile terminal 100 only.

In case that the pressurization sensors are provided to both of the lateral sides of the mobile terminal 100, respectively, if a pressure applied to one of the lateral sides is equal to or greater than a threshold, the controller 180 can determine that the mobile terminal 100 is squeezed. Alternatively, if the pressure applied to each of both of the lateral sides is equal to or greater than a threshold, the controller 180 can determine that the mobile terminal 100 is squeezed. In case of determining whether the mobile terminal 100 is squeezed based on both pressures respectively applied to both lateral sides, the threshold for one of the lateral sides may be equal to or different from that for the other. For instance, when a pressure over a first threshold is applied to one lateral side and a pressure over a second threshold is applied to the other, the controller 180 can determine that the mobile terminal 100 is squeezed.

It is a matter of course that the controller 180 can determine whether the mobile terminal 100 is squeezed using the touch sensor and the depressurization sensor both. And, it is also a matter of course that the controller 180 can determine whether the mobile terminal 100 is squeezed using at least one sensor other than the touch sensor or the depressurization sensor.

In the following description, an unlock pattern shall be explained in detail. In this case, the unlock pattern is a sort of password for releasing the touchscreen from a locked state. And, the unlock pattern may indicate a touch order of a touch region for unlocking the touchscreen.

The controller 180 sets an unlock pattern based on a user's touch to a lateral output unit 151-2. A process for setting an unlock pattern based on a touch input to a lateral output unit 151-2 is described in detail with reference to FIG. 25 as follows.

FIG. 25 is a diagram for one example to describe a process for setting an unlock pattern. For clarity of the following description, assume that an action of squeezing the mobile terminal 100 twice consecutively includes a user input for setting an unlock pattern.

Referring to FIG. 25(a), if the mobile terminal 100 is squeezed twice consecutively, the controller 180 can determine whether a preset unlock pattern exists in the mobile terminal 100. If the preset unlock pattern exists, the controller 180 can enter an input mode on the condition that a user will input a touch matching the unlock pattern. If the preset unlock pattern does not exist, the controller 180 can control the input mode to be entered directly. If the input mode is entered, referring to FIG. 25(b), the controller 180 can control a guidance screen, which is provided to guide a user to set an unlock pattern, to be displayed.

The input mode may mean a state in which a touch input for setting an unlock pattern can be received. If the input mode is entered, the controller 180 can set a plurality of touch regions I to IV on a lateral output unit 151-2 of at least one side. The touch region can be used to normalize a user's touch input to the lateral output unit 151-2. The controller 180 can form the touch regions I to IV by partitioning the lateral output unit 151-2 into a plurality of parts in accordance with a preset size. Alternatively, the controller 180 can form the touch regions I to IV based on a location of a pointer touch to the lateral output unit 151-2 of one side when a user squeezes the mobile terminal. The touch region shall be described in detail with reference to FIG. 26 and FIG. 27 as follows.

FIG. 26 is a diagram for one example to describe a touch region. FIG. 26(a) is a diagram for one example of a location of a pointer (e.g., a finger, etc.) on a lateral output unit 151-2 when a user squeezes the mobile terminal. FIG. 26(b) and FIG. 26(c) are diagrams for examples of setting a touch region in the lateral output unit 151-2.

Referring to FIG. 26(b), the controller 180 can set touch regions I to IV by partitioning the lateral output unit 151-2 into a plurality of regions irrespective of touch locations 2611, 2613, 2615 and 2617 of pointers when the mobile terminal 100 is squeezed. Alternatively, referring to FIG. 26(c), the controller 180 can set a plurality of touch regions I to IV in response to touch locations 2621, 2623, 2625 and 2627 of pointers when the mobile terminal 100 is squeezed. Like the example shown in FIG. 26(c), if the touch regions are set along the touch locations 2611, 2623, 2625 and 2627 of the pointers on squeezing the mobile terminal 100, the number of the touch regions I to IV may match the number of the pointers detected by the lateral output unit 151-2 on one side. Hence, unlike the examples shown in FIG. 26(b) and FIG. 26(c), touch regions, of which number is greater or smaller than 4, may be set on the lateral output unit 151-2.

Depending on a configuration of a user input for setting an unlock pattern, the controller 180 may determine a method of setting the touch regions I to IV on the lateral output unit 151-2. For instance, as a user squeezes the mobile terminal 100, if the input mode for setting the unlock pattern is entered, referring to FIG. 26(c), the controller 180 can control the touch regions I to IV to be set in response to locations of pointers detected from the lateral output unit 151-2. If the input mode is entered by one of other methods (e.g., by selecting a menu for setting an unlock pattern), referring to FIG. 26(b), the controller 180 can control the touch regions I to IV to be set by partitioning the lateral output unit 151-2 into a plurality of parts or regions in accordance with a preset size.

The touch regions I to IV configured in the lateral output unit 151-2 can be displayed in a manner of being visually identifiable from each other. For instance, referring to FIG. 26(b) and FIG. 26(c), the controller 180 can control objects (hereinafter named guide objects) 2611, 2613, 2615, 2617, 2621, 2623, 2625 and 2627, which are provided to guide locations of touch regions, to be displayed through the display unit 151. The locations of the guide objects 2611, 2613, 2615, 2617, 2621, 2623, 2625 and 2627 can be determined in accordance with locations of the set touch regions. The guide objects 2611, 2613, 2615, 2617, 2621, 2623, 2625 and 2627 can be outputted through the lateral output unit 151-2 [FIG. 26(b)] or the front output unit 151-1 [FIG. 26(c)]. Besides, the guide objects 2611, 2613, 2615, 2617, 2621, 2623, 2625 and 2627 can be displayed on each of the front output unit 151-1 and the lateral output unit 151-2.

In the example shown in FIG. 26, the mobile terminal 100 is provided with a single lateral output unit 151-2. Unlike the example shown in FIG. 26, if the lateral output unit 151-2 is provided to each of both sides of the mobile terminal 100, the controller 180 may be able to selectively set a touch region on one of the two lateral output units 151-2. This is described in detail with reference to FIG. 27A and FIG. 27B as follows.

Figure 27A:
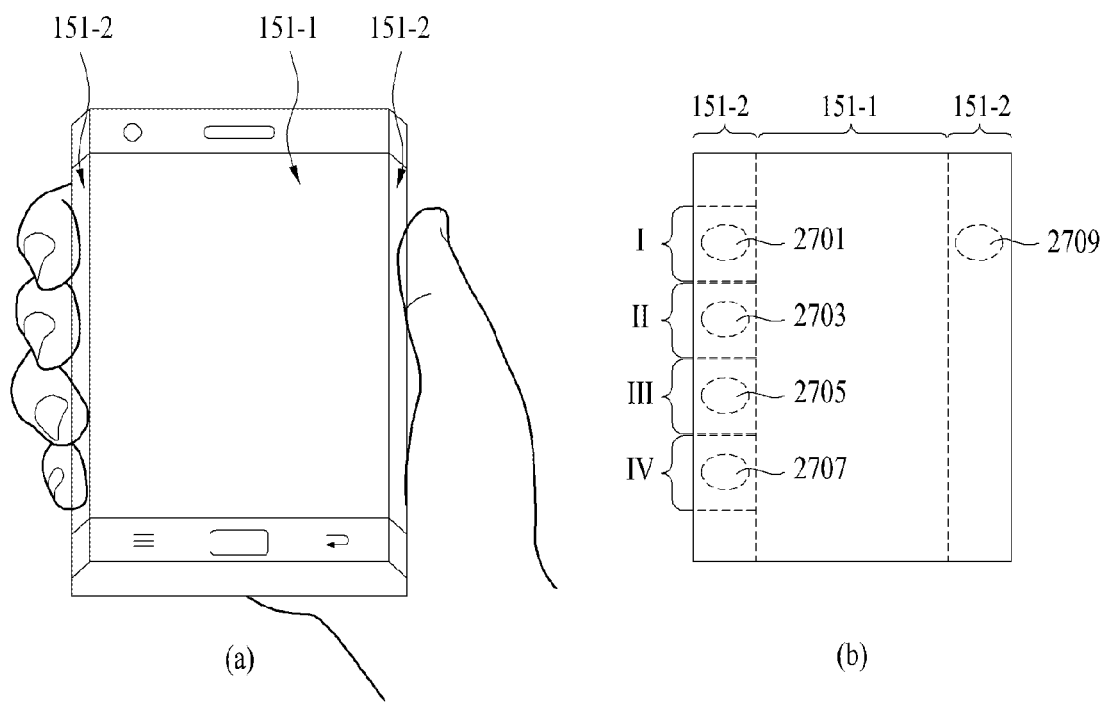

FIG. 27A and FIG. 27B are diagrams for one example to describe a touch region set location if a mobile terminal includes a plurality of lateral output units.

Referring to FIG. 27A and FIG. 27B, if the mobile terminal 100 is squeezed, the controller 180 can control a touch region to be selectively set on one of both lateral output units 151-2 based on a location of a hand with which the mobile terminal 100 is squeezed by a user. For instance, like the example shown in FIG. 27A, if the number of pointers 2701, 2703, 2705 and 2707, which are detected from a right lateral output unit 151-2 in a manner that a user squeezes the mobile terminal 100 with a left hand, is greater than that of pointer 2709 detected from a left lateral output unit 151-2, the controller 180 can control touch regions I to IV to be set only on the right lateral output unit 151-2 from which more pointers are detected. On the contrary, like the example shown in FIG. 27B, if the number of pointers 2711, 2713, 2715 and 2717, which are detected from a left lateral output unit 151-2 in a manner that a user squeezes the mobile terminal 100 with a right hand, is greater than that of pointer 2719 detected from a right lateral output unit 151-2, the controller 180 can control touch regions I to IV to be set only on the left lateral output unit 151-2 from which more pointers are detected.

Besides, the controller 180 can control touch regions to be set on each of the two lateral output units 151-2 [not shown in the drawing]. In this case, the number of the touch regions set on the left lateral output unit 151-2 may be different from that of the touch regions set on the right lateral output unit 151-2.

For clarity of the descriptions of the following embodiments, assume that touch regions are set on a prescribed one of lateral output units 151-2. In particular, assume that 4 touch regions are set on the lateral output unit 151-2. If necessary, a touch region set lateral output unit 151-2 may be named a first lateral output unit 151-2. And, a lateral output unit 151-2 having a touch region not set thereon may be named a second lateral output unit 151-2. Moreover, assume that the 4 touch regions may be named first to fourth regions in top-to-bottom order.

Referring now to FIG. 25, while the mode of the mobile terminal 100 is set to the input mode, if the lateral output unit 151-2 having the touch regions I to IV set thereon is touched, the controller 180 can control the touched touch regions or the touched order of touch region to be visually identified. For instance, after the first region I and the second region II have been simultaneously touched, if the third region III is touched and the first region IV is then touched again, referring to FIG. 25(c) and FIG. 25(d), the controller 180 can control objects (hereinafter named order objects) 2501, 2503, 2505 and 2507, in which numerals are written to identify the touched touch regions and the touched order of touch region are written, to be displayed along locations corresponding to the selected touch regions on the front output unit 151-1, respectively. Besides, the touched touch regions or the touched order of the touch region can be visually identified based on colors or shapes of the objects [not shown in the drawing].

If the input mode is ended, the controller 180 can determine an unlock pattern based on the touch input to the lateral output unit 151-2 on which the touch regions were set in the input mode. For instance, like the example shown in FIG. 25(*b*), if touch inputs are received in the input mode in order of 'simultaneous touches to the first region I and the second region II→touch to the third region III→touch to the first region I', the unlock pattern can indicate the order of 'first & second regions I & II→third region III→first region I'.

In this case, the input mode can be finished if a preset condition is met or a user input for finishing the input mode is received.

For instance, the controller 180 can control the input mode to be finished in one of a case that the lateral output unit 151-2 is not touched again for a prescribed time since a last touch to the lateral output unit 151-2, a case that an icon for finishing the input mode is touched, a case that a prescribed gesture or touch input for finishing the input mode is received, and the like.

In the examples shown in FIG. 25(*c*) and FIG. 25(*d*), an icon 2512 for finishing the input mode is displayed. Like the examples shown in the drawings, the icon 2512 for finishing the input mode may be displayed through the front output unit 151-1. Yet, the icon 2512 for finishing the input mode may be displayed through the lateral output unit 151-2 (e.g., the lateral output unit 151-2 on which the touch region is not set) as well.

In the following description a process for unlocking the mobile terminal 100 having an unlock pattern set therefor is explained in detail with reference to FIG. 23(*b*). First of all, if the state of the mobile terminal 100 is switched to the active state from the inactive state [S2301*b*], a state of the display unit 151 can be set to a locked state [S2302*b*].

If the mobile terminal 100 is in the inactive state, it may mean that the mobile terminal 100 is in a power-off state or a state that the mobile terminal 100 does not display any information through the display unit 151 in sleep mode.

If the mobile terminal 100 is in the power-off state, it is able to activate the mobile terminal 100 by turning on a power of the mobile terminal 100. If the mobile terminal 100 is in the sleep mode, the mobile terminal 100 can be activated in one of a case that a user input for releasing the mobile terminal 100 from the sleep mode is received, a case that an event occurs, and the like.

The user input for releasing the mobile terminal 100 from the sleep mode may include one of a gesture of squeezing the mobile terminal 100 plural times as many as a preset count, an action of pressing an externally exposed button (e.g., a home button, etc.), an action of opening the protective cover of the display unit 151, and the like. The event for releasing the mobile terminal 100 from the sleep mode may include at least one of a case that a reception of a message (e.g., a text message, an instant message, an email, etc.) is notified, a case that a presence of a missed call is notified, a case that there is an incoming call, a case that a new posting is registered at an SNS (social network service) account of a user, a case that a current time is a preset alarm time, a case that a current time reaches a time for starting a pre-registered schedule, a case that a current location is nearby a place for holding a pre-registered schedule, a case that the mobile terminal 100 enters a radio shadow area, a case that the mobile terminal 100 escapes from a radio shadow area, and the like.

If a state of the mobile terminal 100 is switched to an active state, the display unit 151 can enter a locked state. By activating the mobile terminal 100, the controller 180 can control a plurality of touch regions to be set on a lateral output unit 151-2. Since a process for setting the touch region on the lateral output unit 151-2 can refer to the former descriptions with reference to FIG. 26 and FIG. 27, its details shall be omitted from the following description.

While the state of the display unit 151 is set to the locked state, if a touch input for unlocking the display unit 151 is received through the lateral output unit 151-2 [S2303*b*], the controller 180 can determine whether to unlock the display unit 151 by comparing a pattern (hereinafter named an input pattern) formed by the received touch input to a preset unlock pattern [S2304*b*]. If the input pattern matches the unlock pattern, the controller 180 can unlock the display unit 151 [S2305*b*]. On the contrary, if the input pattern fails to match the unlock pattern, the controller 180 can control the display unit 151 to maintain its locked state. A process for unlocking a touchscreen in a locked state is described in detail with reference to FIG. 28 as follows.

FIG. 28 is a diagram for one example to describe a process for unlocking a display unit. For clarity of the following description, assume that the mobile terminal 100 is released from a sleep mode if a user squeezes the mobile terminal 100 once.

Referring to FIG. 28(*a*), if the mobile terminal 100 is squeezed once, the controller 180 can cancel a sleep mode. While cancelling the sleep mode, referring to FIG. 28(*b*), the controller 180 can control a plurality of touch regions I to IV to be set on a lateral output unit 151-2. In the example shown in FIG. 28(*b*), like the foregoing example in FIG. 25, 4 touch regions I to IV are set on the lateral output unit 151-2.

Although the display unit 151 is in the locked state, in order to unlock the display unit 151, the controller 180 can handle a touch input, which is applied to the lateral output unit 151-2 having the touch regions set thereon, as an effective input. If the lateral output unit 151-2 is touched, the controller 180 can control the touched touch regions or the touched order of touch region to be visually identified. For instance, referring to FIG. 28(*c*), the controller 180 can control order objects 2811, 2813, 2815 and 2817, which are provided to identify the selected touch regions, to be displayed through a front display unit 151-1. Since a method of visually identifying the touched touch regions or the touched order of touch region can refer to the foregoing description with reference to FIG. 25, its details shall be omitted from the following description.

If the controller 180 determines that the user's touch input for unlocking the display unit 151 is finished, the controller 180 can determine whether to unlock the display unit 151 by comparing a pattern inputted by the user to a preset unlock pattern. In this case, the controller 180 can determine that the user's touch input is finished in one of a case that the lateral output unit 151-2 is not touched again for a prescribed time since a last touch to the lateral output unit 151-2, a case that an icon for finishing the input mode is touched, a case that a prescribed gesture or touch input for finishing the input mode is received, a case that a touch input applied so far matches an unlock pattern, and the like.

If the user inputted pattern matches the preset unlock pattern, referring to FIG. 28(*d*), the controller 180 unlocks the display unit 151 and is able to control a screen (e.g., a home screen image), which is provided for a user to use the mobile terminal 100 with an appropriate manipulation, to be outputted. If the user inputted pattern fails to match the preset unlock pattern, referring to FIG. 28(*e*), the controller 180 displays a message notifying that the failure in unlocking the display unit 151 and is also able to control the display unit 151 to maintain its locked state.

While the mobile terminal 100 is in the locked state, the controller 180 can control a prescribed object to be displayed through the display unit 151. For instance, if there is an event failing to be checked by a user, an object (hereinafter named a notification object) (e.g., an icon, an indicator, a tab, a text, etc.) notifying a presence of an unchecked event can be displayed. And, an object (hereinafter named an application object) (e.g., an activation icon of an application, etc.) linked to an activation command of an application may be displayed as well.

While the displayed object is selected, if the display unit 151 is unlocked, the controller 180 can control a processing screen, which corresponds to the selected object, to be displayed while unlocking the display unit 151. This is described in detail with reference to FIG. 29 as follows.

FIG. 29 is a diagram for one example to describe an operation of a mobile terminal if a display unit is unlocked in an object selected state. For clarity of the following description, assume that a notification object notifying a presence of an unchecked event is outputted through a front output unit 151-1 in locked state.

Referring to FIG. 29(a), notification objects 2912 and 2914, each of which notifies a presence of an unchecked event, can be displayed through the display unit 151 in locked state. The controller 180 can control a notification object to be displayed for each event. Alternatively, the controller 180 can control a notification object to be displayed for each type of an event. In the example shown in FIG. 29(a), an icon 'message' 2912 notifying a presence of an unchecked text message and an icon 'messenger' 2914 notifying a presence of an unchecked instant message are illustrated as the notification objects.

If a prescribed notification object is selected from a plurality of notification objects, the controller 180 can control the selected notification object to be visually identifiable. For instance, referring to FIG. 29(b), the controller 180 controls an unselected notification object 2914 to be displayed semi-transparently, thereby controlling a user selected notification object 2912 to be visually identified. In the example 29(b), the semi-transparency is depicted using a dotted line. Moreover, it is a matter of course that the user selected notification object can be visually identified in various ways including the way shown in the corresponding drawing.

While the notification object is selected, a touch input for unlocking the display unit 151 may be applied. In this case, if a pattern of the touch input matches a preset unlock pattern, the controller 180 can activate an application for processing an event corresponding to the selected notification object while unlocking the display unit 151.

For instance, referring to FIG. 29(b), while the icon 'message' 2912 is selected, if the display unit 151 is unlocked, the controller 180 can activate a message application for checking a received message. Hence, referring to FIG. 29(c), an active screen of the message application can be displayed through the front output unit 151-1 (or both of the front output unit 151-1 and the lateral output unit 151-2).

While the icon 'messenger' 2914 is selected, if the display unit 151 is unlocked, the controller 180 can activate a messenger application for checking a content of a received message. For another instance, while a notification object notifying a presence of a missed call is selected, if the display unit 151 is unlocked, the controller 180 can activate a phonebook application for obtaining information on a counterpart of the missed call, a call application for making a phone call to the counterpart of the missed call, and/or the like.

Besides, while an application object displayed in locked state is selected, if the display unit 151 is unlocked, the controller 180 can activate an application corresponding to the selected application object while unlocking the display unit 151 [not shown in the drawing].

In the example shown in FIG. 29, the notification objects 2912 and 2914 are displayed through the front output unit 151-1. Unlike the example shown in FIG. 29, at least one of the notification object and the application object may be displayed through the lateral output unit 151-2 of the display unit 151. This is described in detail with reference to FIG. 30 as follows.

FIG. 30 is a diagram for one example of a use in displaying an object through a lateral output unit.

Referring to FIG. 30(a), touch regions I to IV for unlocking the display unit 151 is set on a lateral output unit 151-2 (e.g., a first lateral output unit 151-2) on one side and notification objects 3012 and 3014 can be displayed on a lateral output unit 151-2 (e.g., a second lateral output unit 151-2) on the other side. In this case, the controller 180 determines that a touch input to the lateral output unit 151-2 (e.g., the first lateral output unit 151-2) on one side is applied to unlock the display unit 151 and may also determine that a touch input to the lateral output unit 151-2 (e.g., the second lateral output unit 151-2) on the other side is applied to select the notification object 3012/3014.

Hence, while one of the notification objects displayed through the second lateral output unit 151-2 is selected [e.g., a message icon is selected in the example shown in FIG. 30(b)] [FIG. 30(b)], if a touch input of the same as the unlock pattern is applied through the first lateral output unit 151-2, the controller 180 can control an application for processing an event corresponding to the selected notification object to be activated while unlocking the display unit 151 [e.g., a message application is activated in the example shown in FIG. 30(c)] [FIG. 30(c)].

In order to protect the mobile terminal 100 against an external shock, a protective cover can be applied to the mobile terminal 100 according to the present invention. While the protective cover applied to the mobile terminal 100 according to the present invention covers the front output unit 151-1, the lateral output unit 151-2 may be exposed externally. Hence, a user is able to watch the lateral output unit 151-2 at any time while the protective cover is applied. In doing so, the controller 180 can determine whether the protective cover currently covers the front output unit 151-1 based on a sensing signal of the sensing unit 140.

If the protective cover covers the front output unit 151-1, the controller 180 can control a notification object, which notifies an occurrence of an event, to be displayed through the lateral output unit 151-2. Moreover, the controller 180 can control a detailed information on the event to be displayed through the lateral output unit 151-2 as well. This is described in detail with reference to FIG. 31 and FIG. 32 as follows.

Figure 31:
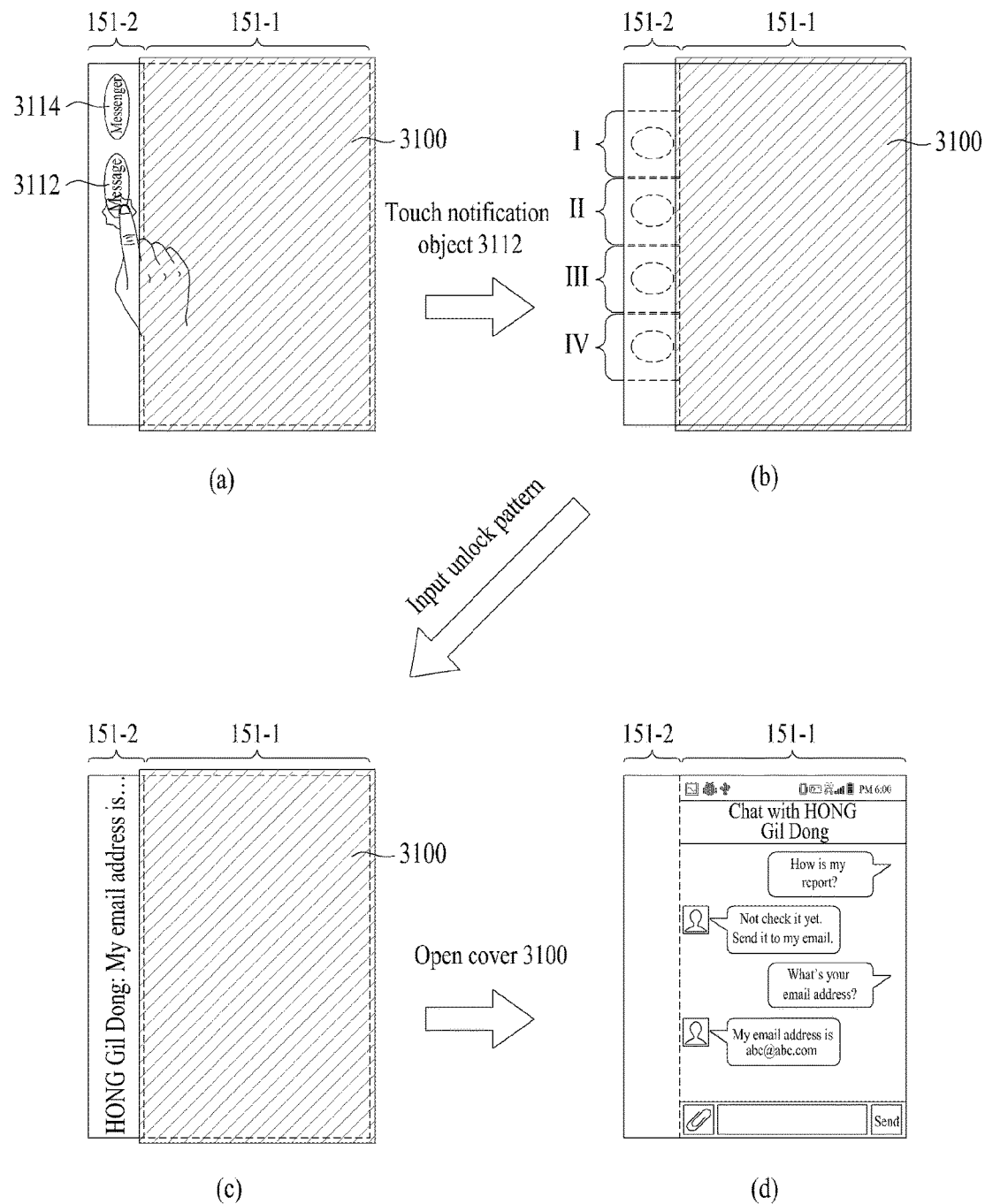
FIG. 31 is a diagram for one example to describe one operation of a mobile terminal having a protective cover applied thereto.

FIG. 31 is a diagram for one example to describe one operation of a mobile terminal having a protective cover applied thereto. For clarity of the following description, assume that the mobile terminal 100 is provided with a single lateral output unit 151-2.

Referring to FIG. 31(a), while a protective cover 3100 covers a front output unit 151-1, if an event occurs, the controller 180 can control notification objects 3112 and 3114, each of which notifies that an event has occurred, to be displayed through a lateral output unit 151-2.

If the notification object displayed through the lateral output unit 151-2 is selected [e.g., the message icon 3112 is selected in the example shown in FIG. 31(*a*)], referring to FIG. 31(*b*), the controller 180 stops displaying the notification objects 3112 and 3114 and is able to set a plurality of touch regions I to IV on the lateral output unit 151-2.

If a touch input to the lateral output unit 151-2 matches a preset unlock pattern, referring to FIG. 31(*c*), the controller 180 can control a detailed information on the event, which corresponds to the selected notification object 3112, to be displayed through the lateral output unit 151-2.

In this case, the detailed information on the event may include a content of an externally received message, an information (e.g., a name of a counterpart, a phone number of the counterpart, a photo of the counterpart, etc.) on the counterpart of an incoming call, an information on a counterpart of a missed call in case of a presence of the missed call, a content of a new posting subscribed at an SNS account of a user, a content of an alarm on a current hour corresponding to an alarm time, a content of a schedule on a current hour corresponding to a time at which a pre-registered schedule begins, a content indicating that a preset location is entered in case of a current location corresponding to a location nearby a preset location, a content notifying an entry of the mobile terminal 100 into a radio shadow area, a content notifying that the mobile terminal 100 escapes from a radio shadow area, and the like.

While the detailed content of the event is displayed through the lateral output unit 151-2, if the protective cover 3100 is opened, the controller 180 can activate an application for processing the event corresponding to the selected notification object 3112. Hence, referring to FIG. 31(*d*), an active screen of the application for processing the event may be displayed through the front output unit 151-1 (or both of the front output unit 151-1 and the lateral output unit 151-2) [e.g., a message application is activated in the example shown in FIG. 31(*d*)].

If the touch input to the lateral output unit 151-2 fails to match the preset unlock pattern, the detailed information on the vent is not displayed through the lateral output unit 151-2. Moreover, even if the protective cover 3100 is opened, the application for processing the event corresponding to the selected notification object may not be activated.

Thus, while the protective cover 3100 covers the front output unit 151-1, the unlock pattern can be used as a password for displaying the detailed information on the event through the lateral output unit 151-2.

If a pair of lateral output units 151-2 are provided to both sides of the mobile terminal 100, respectively, the lateral output unit 151-2 having a notification object displayed thereon may be different from the lateral output unit 151-2 having touch regions set thereon. This is described in detail with reference to FIG. 32 as follows.

Figure 32:
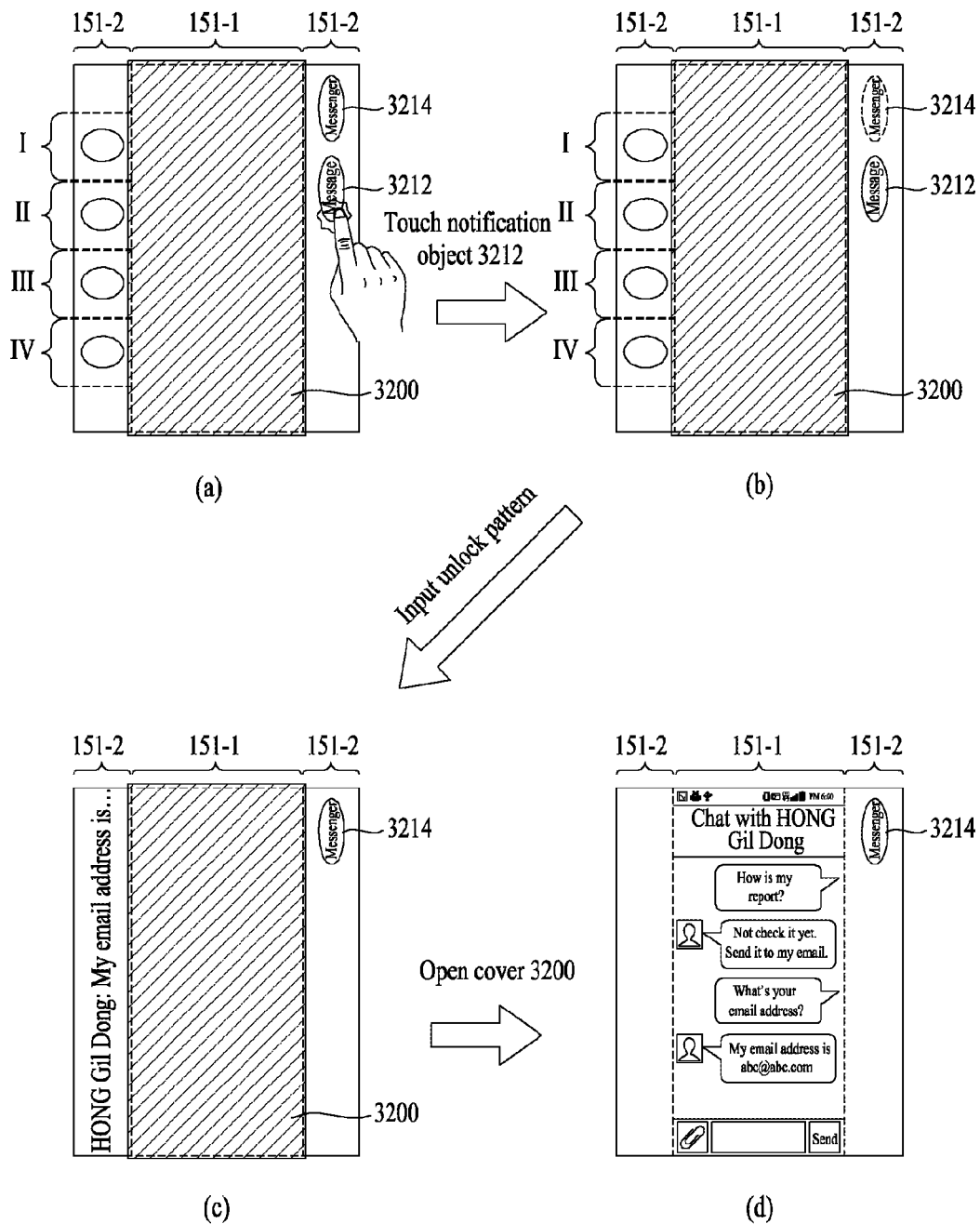
FIG. 32 is a diagram for one example to describe another operation of a mobile terminal having a protective cover applied thereto.

FIG. 32 is a diagram for one example to describe another operation of a mobile terminal having a protective cover applied thereto. Unlike FIG. 31, assume that a pair of lateral output unit 151-2s are provided to both sides of the mobile terminal 100, respectively.

Referring to FIG. 32(*a*), while a protective cover 3200 covers a front output unit 151-1, if an event occurs, the controller 180 controls notification objects 3212 and 3214, each of which notifies that an event has occurred, to be displayed through a lateral output unit 151-2 on one side (e.g., a second lateral output unit 151-2) and is also able to control touch regions I to IV for to be set through the lateral output unit 151-2 on the other side (e.g., a first lateral output unit 151-2).

In doing so, the controller 180 may determine that a touch input to the first lateral output unit 151-2 is applied to input a password for displaying a detailed information on the event. And, the controller 180 may determine that a touch input to the second lateral output unit 151-2 is applied to select the notification object 3212/3214.

If the touch input to the first lateral output unit 151-2 having the touch regions I to IV set thereon matches a preset unlock pattern, referring to FIG. 32(*c*), the controller 180 can control the detailed information on the event to be displayed on at least one of a pair of the lateral output units 151-2. In the examples shown in FIG. 32(*c*), the detailed information on the event is displayed through the first lateral output unit 151-2 having the touch regions I to IV set thereon.

If the detailed information on the event is displayed through the first lateral output unit 151-2, the controller 180 determines that a user completes a confirmation of the corresponding event and is then able to control the second lateral output unit 151-2 to stop outputting the notification object 3212 for the corresponding event.

While the detailed information on the event is displayed through the first lateral output unit 151-2, if a new notification object is touched in the second lateral output unit 151-2, although a touch input matching the unlock pattern is not applied, the controller 180 can control the detailed information on the event, which corresponds to the newly touched notification object, to be displayed through one of the lateral output units 151-2. For instance, if the messenger icon 3214 displayed through the second lateral output unit 151-2 is touched in FIG. 32(*c*), although the touch matching the preset unlock pattern is not inputted, the controller 180 can control the detailed information on the event, which corresponds to the messenger icon 3214, to be displayed through the first lateral output unit 151-2 (or the second lateral output unit 151-2).

In particular, if the touch input matching the unlock pattern is inputted once, when a detailed information on a new notification object is displayed, it may not require an input of a touch matching the unlock pattern again.

While the detailed information on the event is displayed through the lateral output unit 151-2, if the protective cover 1400 is opened, the controller 180 can activate an application for processing the event corresponding to the selected notification object. Hence, referring to FIG. 32(*d*), an active screen of the application for processing the event may be displayed through the front output unit 151-1 (or both of the front output unit 151-1 and the lateral output unit 151-2) [e.g., a message application is activated in the example shown in FIG. 32(*d*)].

Accordingly, embodiments of the present invention provide various effects and/or features.

First of all, the present invention can provide a mobile terminal, by which user's convenience can be enhanced.

In particular, the present invention provides a mobile terminal and controlling method thereof, by which an object indicating an event occurrence can be displayed on a lateral side of the mobile terminal.

And, the present invention provides a user interface (UI) suitable for a flexible display adopted mobile terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an object indicating an event occurrence can be displayed on a lateral side of the mobile terminal.

Another object of the present invention is to provide a mobile terminal and controlling method thereof, by which a user interface (UI) suitable for a flexible display adopted mobile terminal can be provided.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a wireless communication unit configured to perform a wireless communication, a touchscreen having a front output unit exposed from a front side of the touchscreen and at least one lateral output unit exposed from a lateral side of the touchscreen, and a controller, if an event occurs, controlling an object to be displayed on the lateral output unit to notify that the event occurs, the controller controls a detailed information on the event to be displayed through at least one of the front output unit and the lateral output unit in response to a input to the lateral output unit.

In another aspect of the present invention, as embodied and broadly described herein, a method of controlling a mobile terminal according to the present invention may include the steps of if an event occurs, displaying an object on a lateral output unit to notify that the event occurs and displaying a detailed information on the event through at least one of a front output unit and the lateral output unit in response to a input to the object.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit configured to perform a wireless communication;
a touchscreen having a front portion and at least one lateral portion, the front portion being exposed at a front side of a body of the mobile terminal, and the at least one lateral portion being exposed at a lateral side of the body of the mobile terminal, wherein the at least one lateral portion is discriminated from the front portion such that at least one lateral portion of the touchscreen is bent; and
a controller configured to:
display a notification object on the lateral portion when an event occurs; and
display a detailed information of the event on the front portion in response to an input at the notification object, wherein the input is touched at the notification object and is then dragged toward the front portion.

2. The mobile terminal of claim 1, wherein the controller is configured to determine an amount of the detailed information of the event based on the input.

3. The mobile terminal of claim 1, wherein the controller is configured to determine an amount of the detailed information of the event based on a releasing point of the input.

4. The mobile terminal of claim 3, wherein the controller is configured to determine a size of the notification object based on the amount of the detailed information of the event.

5. The mobile terminal of claim 1, wherein the controller is configured to identify the notification object with a color or an icon based on a type of an event or a counterpart who has triggered the event.

6. The mobile terminal of claim 1, wherein the controller is configured to display a plurality of notification objects on the lateral portion when a plurality of events occurs.

7. The mobile terminal of claim 1, wherein the controller is configured to display a number of event occurrence on the notification object when the event of the same type further occurs.

8. The mobile terminal of claim 1, wherein the controller is configured to perform a function related to the event in response to selecting an operation button, wherein the operation button is displayed on the detailed information.

9. The mobile terminal of claim 1, wherein the event comprises one selected from the group consisting of:
   i) a case that a message is received;
   ii) a case that there is an incoming call;
   iii) a case that a new posting is registered at an SNS (social network service) account of a user;
   iv) a case that a current time is a preset alarm time;
   v) a case that a current time reaches a time for starting a pre-registered schedule;
   vi) a case that a current location is nearby a preset location;
   vii) a case that a current location is nearby a place for holding a pre-registered schedule;
   viii) a case that the mobile terminal enters a radio shadow area;
   ix) a case that the mobile terminal escapes from the radio shadow area; and
   x) a case that a presence of a missed call is notified.

10. A method of controlling a mobile terminal, comprising:
   in response to an occurrence of an event, displaying a notification object on a lateral portion of a touchscreen of the mobile terminal to notify that the event occurs, the lateral portion of the touchscreen being exposed at a lateral side of a body of the mobile terminal;
   receiving an input at the displayed notification object; and
   displaying a detailed information of the event on a front portion of the touchscreen in response to an input at the notification object, wherein the input is touched at the notification object and is then dragged toward the front portion, the front portion of the touchscreen being exposed at a front side of the body of the mobile terminal, wherein the at least one lateral portion is discriminated from the front portion such that at least one lateral portion of the touchscreen is bent.

* * * * *